United States Patent
Utsumi

(10) Patent No.: US 10,705,906 B2
(45) Date of Patent: Jul. 7, 2020

(54) APPARATUS AND CONTROL METHOD THEREOF

(71) Applicant: Toshiba Memory Corporation, Minato-ku (JP)

(72) Inventor: Tomoo Utsumi, Chigasaki (JP)

(73) Assignee: Toshiba Memory Corporation, Minato-ku (JP)

( * ) Notice: Subject to any disclaimer, the term of this patent is extended or adjusted under 35 U.S.C. 154(b) by 47 days.

(21) Appl. No.: 16/109,118

(22) Filed: Aug. 22, 2018

(65) Prior Publication Data

US 2019/0235951 A1    Aug. 1, 2019

(30) Foreign Application Priority Data

Feb. 1, 2018  (JP) ................................ 2018-016520
Mar. 1, 2018  (JP) ................................ 2018-036928

(51) Int. Cl.
*G06F 11/10*  (2006.01)
*G06F 3/06*  (2006.01)
*H04L 1/00*  (2006.01)

(52) U.S. Cl.
CPC .......... *G06F 11/1048* (2013.01); *G06F 3/061* (2013.01); *G06F 11/1004* (2013.01); *G06F 11/108* (2013.01); *H04L 1/00* (2013.01)

(58) Field of Classification Search
CPC .. G06F 11/1048; G06F 11/1004; G06F 3/061; G06F 11/108; H04L 1/00
See application file for complete search history.

(56) References Cited

U.S. PATENT DOCUMENTS

| | | | |
|---|---|---|---|
| 9,083,521 B2 * | 7/2015 | Sgraja | ................... H04L 1/0003 |
| 2004/0114598 A1 * | 6/2004 | Veerepalli | ............. H04L 1/1829 370/394 |
| 2012/0192038 A1 | 7/2012 | Cho | |
| 2015/0154070 A1 | 6/2015 | Chen et al. | |
| 2017/0099371 A1 | 4/2017 | Yi et al. | |
| 2018/0139033 A1 * | 5/2018 | Okada | .................. H04N 21/438 |

\* cited by examiner

*Primary Examiner* — Thien Nguyen
(74) *Attorney, Agent, or Firm* — Oblon, McClelland, Maier & Neustadt, L.L.P.

(57) ABSTRACT

According to one embodiment, an apparatus is capable of exchanging a frame with an external apparatus in a packet mode of serial attached small computer system interface (SAS). The apparatus includes a controller configured to transmit a frame to the external apparatus, and to transmit a PACKET_SYNC extended binary primitive to the external apparatus when the frame is not correctly received by the external apparatus.

20 Claims, 23 Drawing Sheets

| | Gen4 | | Gen5 | |
|---|---|---|---|---|
| | Scrambler/ descrambler RUN | Scramble/ descramble | Scrambler/ descrambler RUN | Scramble/ descramble |
| Primitive | NO | NO | YES | NO |
| Dword in frame | YES | YES | YES | YES |
| Dword out of frame | YES | YES | YES | YES |

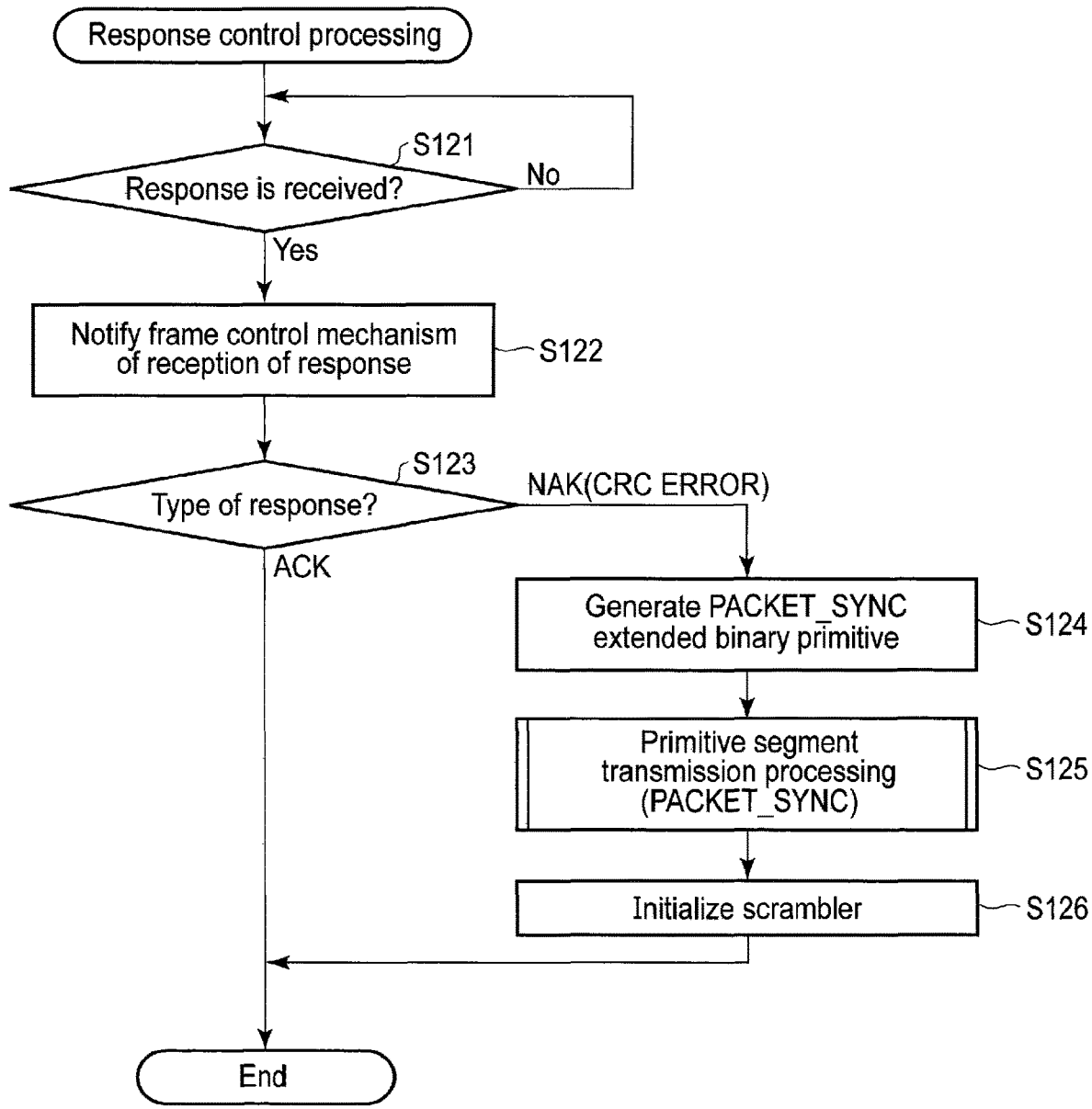
F I G. 11

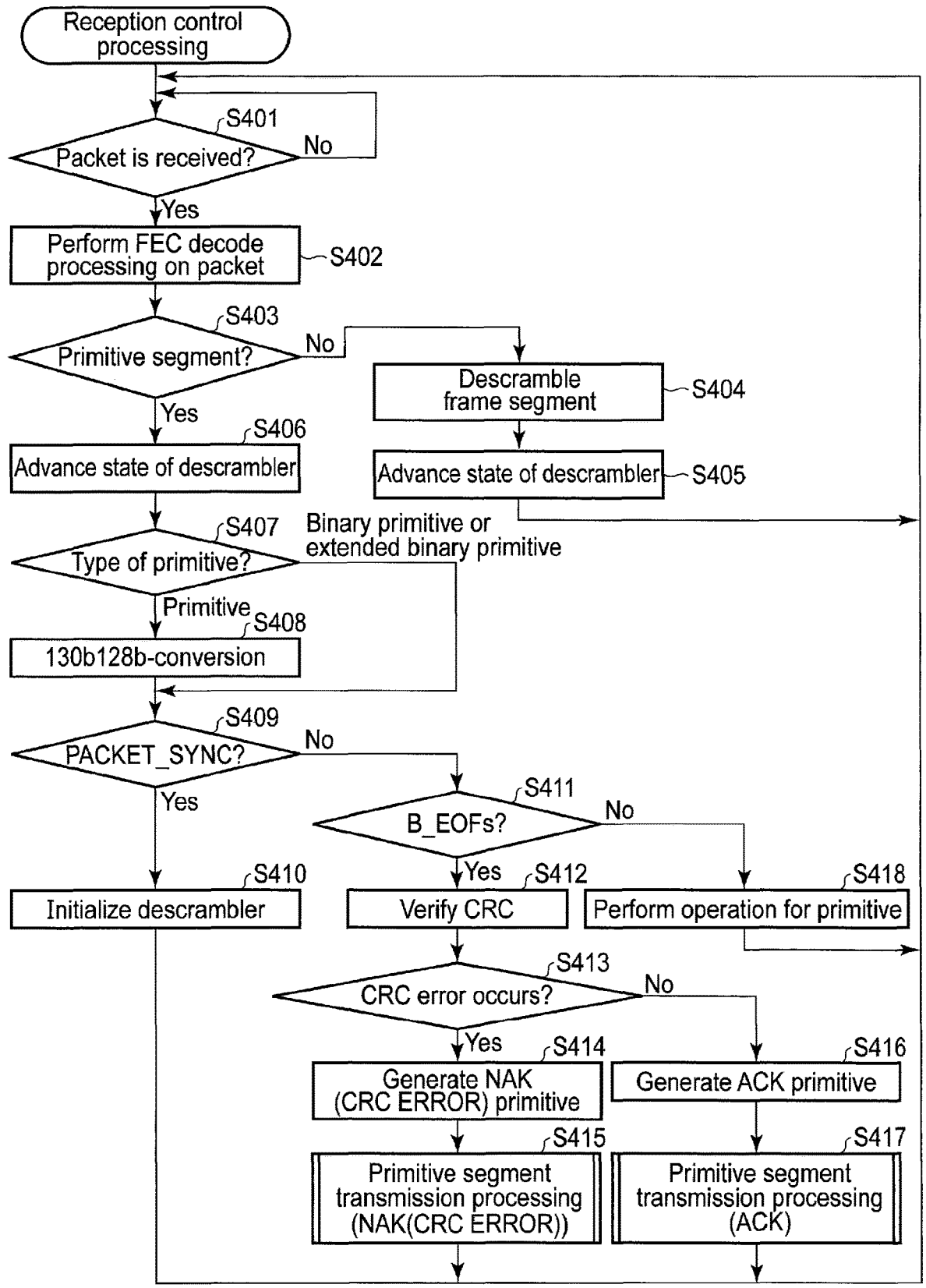
F I G. 15

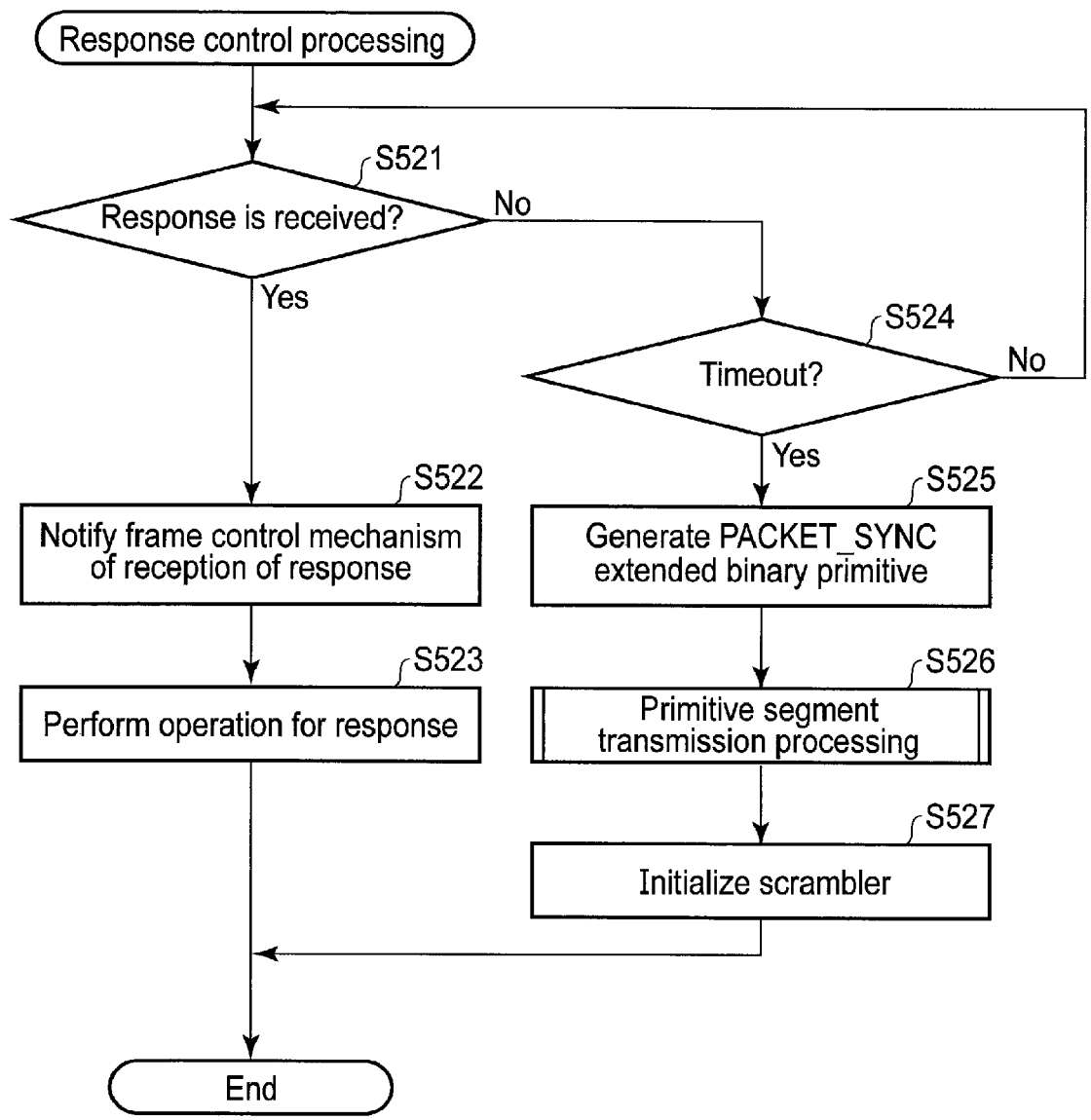
F I G. 18

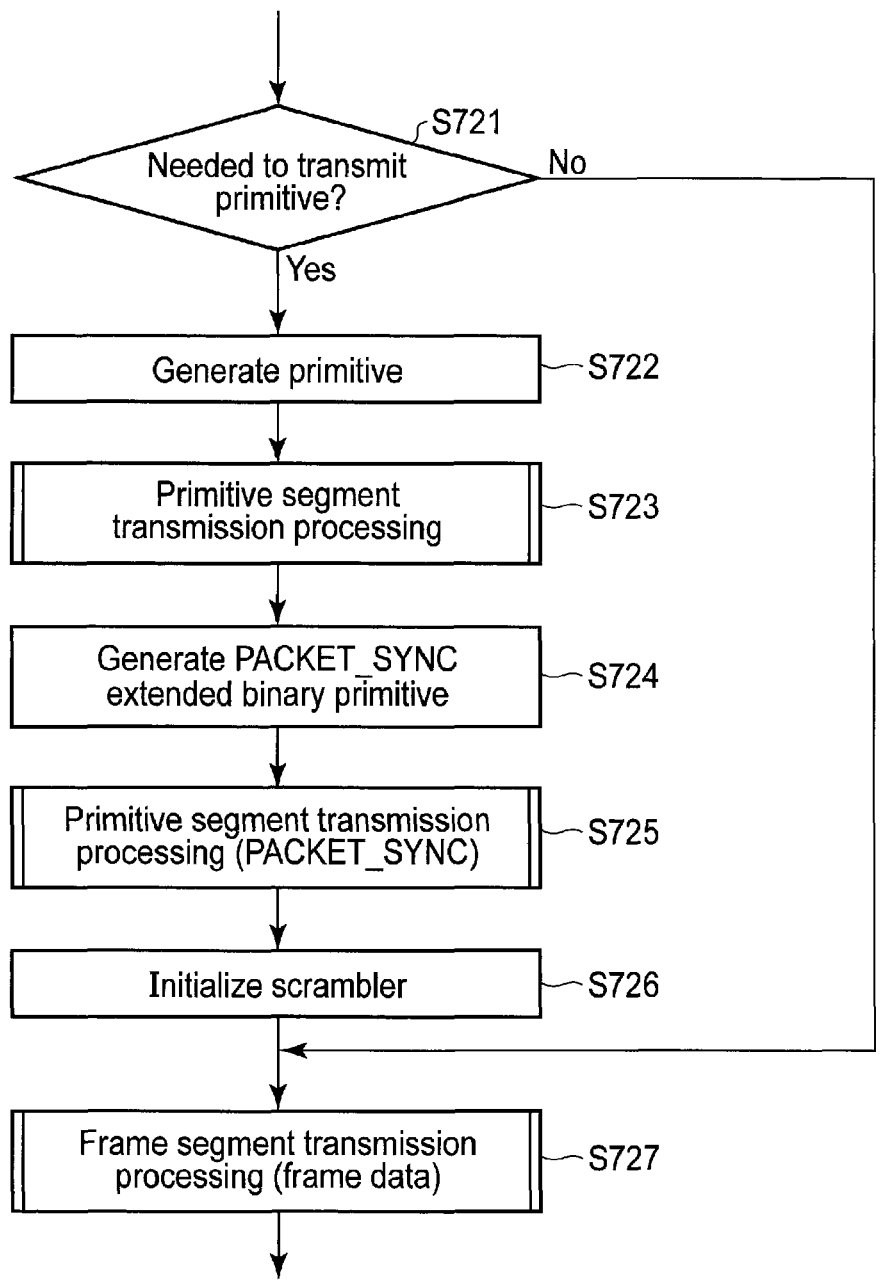
F I G. 22

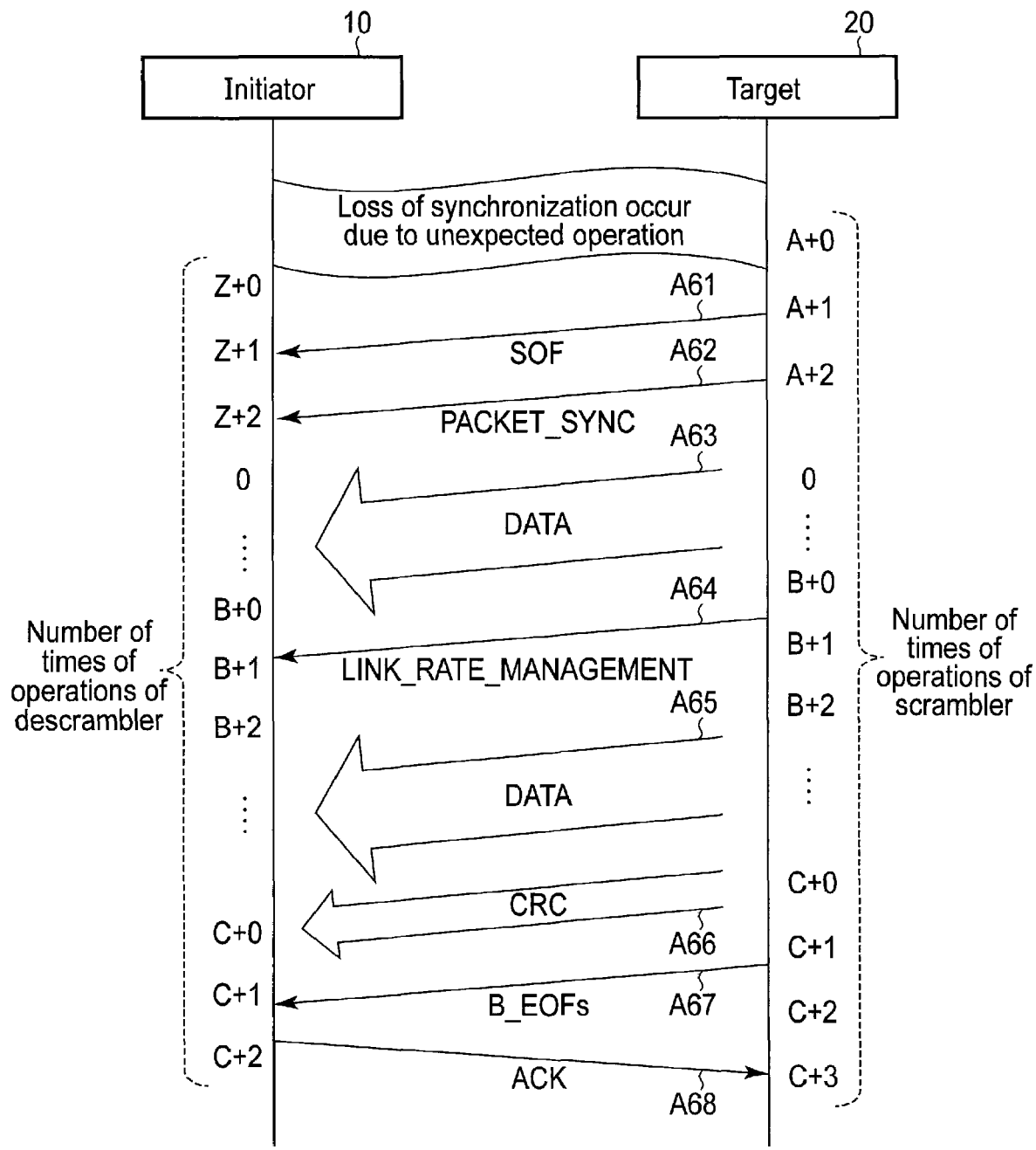
F I G. 23

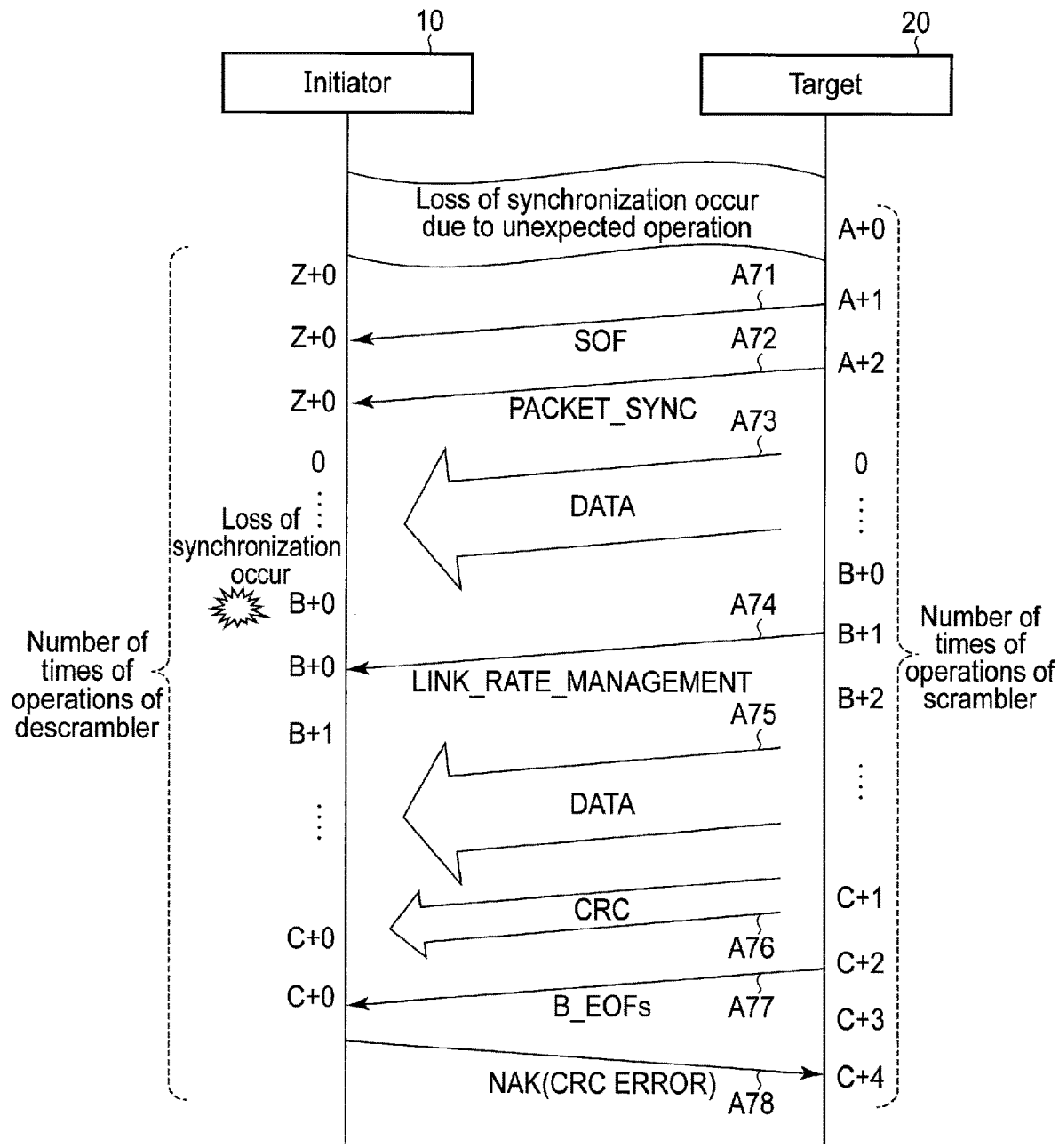
F I G. 24

APPARATUS AND CONTROL METHOD THEREOF

CROSS-REFERENCE TO RELATED APPLICATIONS

This application is based upon and claims the benefit of priority from Japanese Patent Applications No. 2018-016520, filed Feb. 1, 2018; and No. 2018-036928, filed Mar. 1, 2018, the entire contents of all of which are incorporated herein by reference.

FIELD

Embodiments described herein relate generally to an apparatus connected via a serial attached small computer system interface (serial attached SCSI: SAS), and a method of controlling the apparatus.

BACKGROUND

SAS is an interface standard for connecting two or more apparatuses. SAS defines a specification for establishing connection between an initiator device (which will be denoted as initiator below) and a target device (which will be denoted as target below) and exchanging commands or user data therebetween.

Each of the initiator and the target includes a scrambler and a descrambler to reduce a deviation of bits in exchanged interface data. When the scrambler in the initiator is synchronized with the descrambler in the target, interface data transmitted by the initiator and received by the target is appropriately scrambled/descrambled. Similarly, when the scrambler in the target is synchronized with the descrambler in the initiator, interface data transmitted by the target and received by the initiator is appropriately scrambled/descrambled.

SAS4 standard newly defines SAS Gen5. A packet mode is supported in the SAS Gen5 instead of the dword mode supported in SAS Gen4. Interface data is handled in units of 40 bits in the dword mode while interface data is handled in units of 150 bits in the packet mode.

The packet mode is different from the dword mode in timing when the scrambler and the descrambler are synchronized. In the dword mode, the scrambler is initialized on transmission of a primitive indicating the start of a frame and the descrambler is initialized on reception of the primitive.

To the contrary, in the packet mode, the scrambler is initialized on transmission of PACKET_SYNC extended binary primitive (which will be also denoted as PACKET_SYNC below) and the descrambler is initialized on reception of the PACKET_SYNC. Timing to exchange PACKET_SYNC is not related with exchanging a frame. Thus, when a loss of synchronization between the scrambler and the descrambler occurs due to an unexpected operation, the loss of synchronization may continue until PACKET_SYNC is exchanged again, and errors may be caused in a series in frames transmitted between the initiator and the target.

BRIEF DESCRIPTION OF THE DRAWINGS

FIG. 11 is a flowchart illustrating an exemplary procedure of a response control processing performed by the apparatus of the first embodiment.

FIG. 15 is a flowchart illustrating an exemplary procedure of a reception control processing performed by the apparatus of the first embodiment.

FIG. 18 is a flowchart illustrating an exemplary procedure of a response control processing performed by the apparatus of the second embodiment.

FIG. 22 is a flowchart illustrating another exemplary procedure of the transmission control processing performed by the apparatus of the third embodiment.

FIG. 23 is an exemplary diagram illustrating that PACKET_SYNC is transmitted after a primitive indicating the start of a frame transmission is transmitted in an information processing system including an apparatus according to a fourth embodiment.

FIG. 24 is an exemplary diagram illustrating that a loss of synchronization between a scrambler and a descrambler is caused because of a primitive transmitted within a frame.

DETAILED DESCRIPTION

Figures 1, 2:
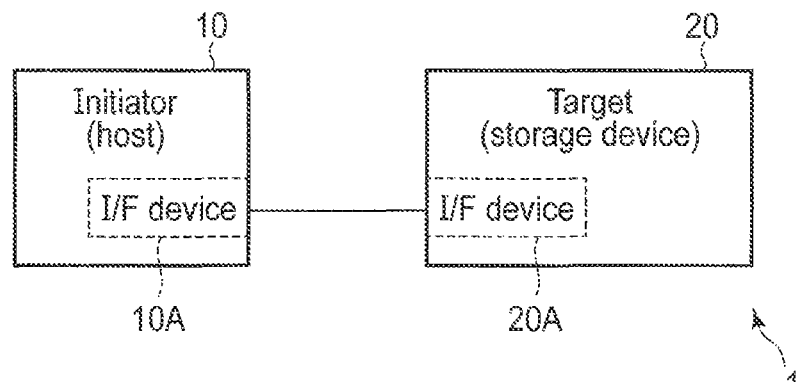
FIG. 1 is an exemplary block diagram illustrating a configuration of an information processing system including an apparatus according to a first embodiment.
FIG. 2 is a diagram for explaining differences of the operations of a scrambler/descrambler between a SAS Gen5 apparatus and a SAS Gen4 apparatus.

In general, according to one embodiment, an apparatus is capable of exchanging a frame with an external apparatus in a packet mode of serial attached small computer system interface (SAS). The apparatus includes a controller configured to transmit a frame to the external apparatus, and to transmit a PACKET_SYNC extended binary primitive to the external apparatus when the frame is not correctly received by the external apparatus.

Various embodiments will be described hereinafter with reference to the accompanying drawings.

(First Embodiment)

A configuration of an information processing system including apparatuses according to a first embodiment will be first described with reference to FIG. 1. The information processing system 1 includes two apparatuses connected via a SAS interface. One of the apparatuses is an initiator device (initiator) 10, and the other is a target device (target) 20.

The initiator 10 is a host such as a computer. The target 20 is a storage device such as a hard disk drive (HDD) or a solid state drive (SSD). The initiator 10 and the target 20 include interface devices 10A and 20A operating in accordance with the SAS specification, respectively. The initiator 10 and the target 20 can exchange commands or user data via the interface devices 10A and 20A. The initiator 10 and the target 20 can operate as any of a transmitter device for transmitting a frame and a receiver device (Rx) for receiving a frame. Since each transmitted frame includes a cyclic redundancy check (CRC), reliability of frame data is obtained.

A term "frame" may refer to one of an address frame, a serial small computer system interface protocol (SSP) frame, a serial management protocol (SMP) frame, and a serial advanced technology attachment tunneled protocol (STP) frame.

Each of the interface device 10A in the initiator 10 and the interface device 20A in the target 20 includes a scrambler and a descrambler to reduce a deviation of bits in exchanged interface data. When frame data is transmitted from the initiator 10 to the target 20, the initiator 10 transmits the frame data scrambled with the scrambler to the target 20, and the target 20 descrambles the frame data received from the initiator 10 with the descrambler. Similarly, when frame data is transmitted from the target 20 to the initiator 10, the target 20 transmits the frame data scrambled with the scrambler to the initiator 10, and the initiator 10 descrambles the frame data received from the target 20 with the descrambler.

The states of the scrambler and the descrambler are advanced per operation, and a pattern used for scrambling/descrambling is accordingly changed. Hereinafter, advancing the state of the scrambler or the descrambler may be referred to as "run" or "RUN". If the number of times of operations from the initial states is the same between the scrambler and the descrambler, in other words, if the scrambler is synchronized with the descrambler, the same pattern is generated therebetween.

Thus, if the scrambler in the initiator 10 is synchronized with the descrambler in the target 20, the scrambler and the descrambler generate the same pattern for scrambling/descrambling, thereby appropriately scrambling/descrambling frame data transmitted from the initiator 10 to the target 20. Similarly, if the scrambler in the target 20 is synchronized with the descrambler in the initiator 10, the scrambler and the descrambler generate the same pattern for scrambling/descrambling, thereby appropriately scrambling/descrambling frame data transmitted from the target 20 to the initiator 10.

However, when a difference in the number of times of operations (hereinafter may also be referred to as loss of synchronization) occurs between the scrambler in the initiator 10 and the descrambler in the target 20, or when a difference in the number of times of operations occurs between the scrambler in the target 20 and the descrambler in the initiator 10, this fact cannot be detected during an idle period, and is detected as a reception error on reception of a frame. The reception error is a CRC error, for example.

The operations of the scrambler and the descrambler are different between the dword mode of SAS Gen4 and the packet mode of SAS Gen5. FIG. 2 illustrates the same operations and different operations of the scrambler and the descrambler between SAS Gen4 and SAS Gen5.

As illustrated in FIG. 2, the SAS Gen4 scrambler does not run and does not scramble a primitive when the primitive is transmitted. The SAS Gen4 descrambler does not run and does not descramble a primitive when the primitive is received.

On the other hand, the SAS Gen5 scrambler runs but does not scramble a primitive when the primitive is transmitted. The SAS Gen5 descrambler runs but does not descramble a primitive when the primitive is received.

As stated, what the scrambler runs means that the number of times of operations of the scrambler increments and the scrambler advances to a next state. The scrambler generates a different pattern for scrambling whenever the state advances. Also, what the descrambler runs means that the number of times of operations of the descrambler increments and the descrambler advances to a next state. The descrambler generates a different pattern for descrambling whenever the state advances.

When a dword in a frame or a dword out of a frame is transmitted, the scrambler and the descrambler in SAS Gen4 run and scramble/descramble the dword. Similarly, when a dword in a frame or a dword out of a frame is transmitted, the scrambler and the descrambler in SAS Gen5 run and scramble/descramble the dword.

In this way, the scrambler and the descrambler in SAS Gen4 are different from the scrambler and the descrambler in SAS Gen5 in whether they run when a primitive is exchanged.

Figure 3:
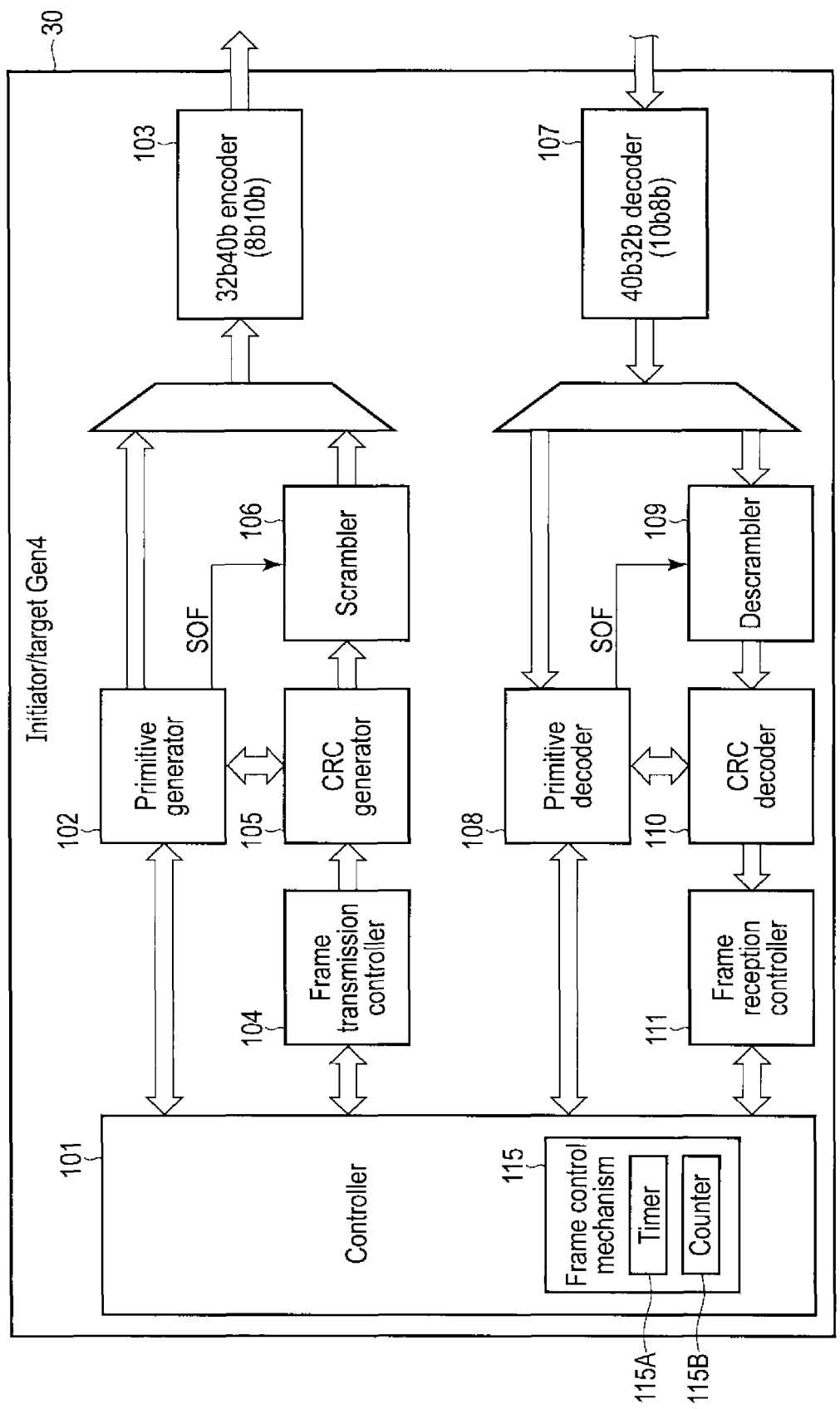
FIG. 3 is a block diagram illustrating a configuration of the SAS Gen4 apparatus.
Figure 4:
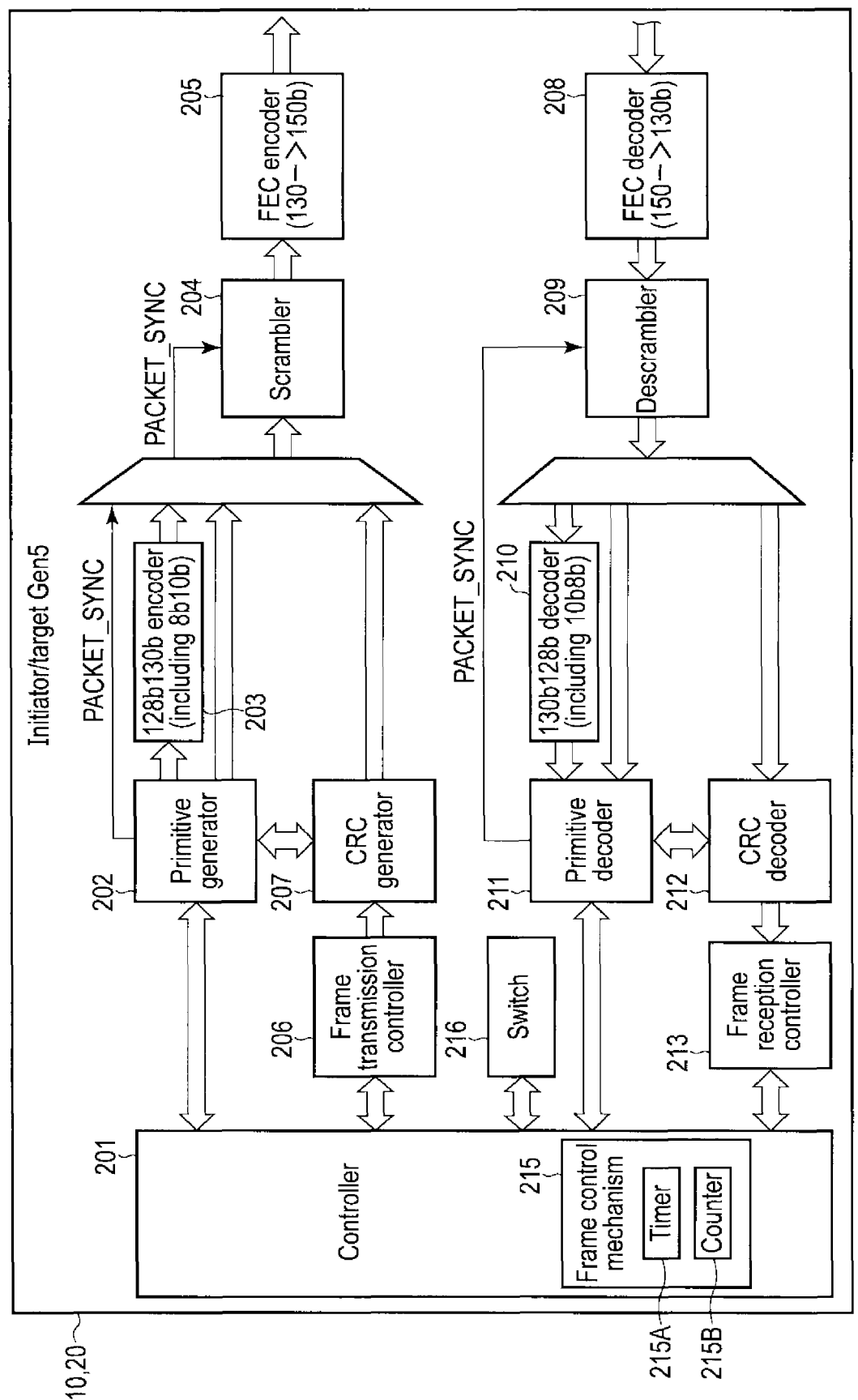
FIG. 4 is a block diagram illustrating a configuration of the apparatus of the first embodiment.

As illustrated in FIGS. 3 and 4, a SAS Gen4 apparatus 30 is different from the SAS Gen5 apparatuses 10 and 20 according to the present embodiment in its configuration depending on the above differences.

FIG. 3 illustrates a configuration of the SAS Gen4 apparatus 30. The apparatus 30 can operate as any of an initiator and a target. The apparatus 30 can exchange frames, which include a primitive and frame data, with another apparatus 30 connected via a SAS Gen4 interface.

The apparatus 30 includes a controller 101, a primitive generator 102, a 32b40b (8b10b) encoder 103, a frame transmission controller 104, a CRC generator 105, a scrambler 106, a 40b32b (10b8b) decoder 107, a primitive decoder 108, a descrambler 109, a CRC decoder 110, and a frame reception controller 111. The units 101 to 111 can be realized by a circuit in a System-on-a-chip (SoC). The functions of the units 101 to 111 may be realized by hardware such as a circuit, or may be realized by firmware.

The controller 101 controls the operations of various components in the apparatus 30. The controller 101 controls each unit in the apparatus 30 to transmit a frame to another apparatus 30, and controls each unit in the apparatus 30 to receive a frame from another apparatus 30. The controller 101 includes a frame control mechanism 115. The frame control mechanism 115 has a function of processing for a response in accordance with a received primitive or a frame, and a timer function of detecting a timeout. When a frame is transmitted, the frame control mechanism 115 increments a counter 115B and starts a timer 115A. When a response to the transmitted frame is received, the frame control mechanism 115 decrements the counter 115B. When the counter 115B reaches zero, the timer 115A stops. When the timer 115A detects a timeout, the frame control mechanism 115 controls to perform a processing for the timeout. The counter 115B indicates a balance between the number of transmitted frames and the number of received responses (e.g., ACK or NAK).

The operations of the respective units in the apparatus 30 will be described below for cases in which a frame is transmitted and the frame is received.

First, a case in which an apparatus 30 transmits a frame to another apparatus 30 will be described. In this case, the controller 101, the primitive generator 102, the 32b40b encoder 103, the frame transmission controller 104, the CRC generator 105, and the scrambler 106 operate.

The primitive generator 102 generates a primitive in response to a request (or, a notification) from the controller 101 or the CRC generator 105, and outputs the generated primitive to the 32b40b encoder 103. When the generated primitive is a SOF primitive indicating the start of a frame (which will be also denoted as SOF below) or a SOAF primitive (which will be also denoted as SOAF below), the primitive generator 102 notifies the scrambler 106 of transmission of SOF or SOAF.

The frame transmission controller 104 controls transmission of frame data included in a frame in response to a request from the controller 101. The frame transmission controller 104 outputs, for example, frame data in units of 32 bits (i.e., four data bytes) to the CRC generator 105.

The CRC generator 105 calculates a CRC value of the frame data included in the frame. The CRC generator 105 outputs the frame data and the CRC value to the scrambler 106. The CRC generator 105 calculates the CRC value by use of all the frame data in the frame, and then requests the primitive generator 102 to generate an EOF primitive (which will be also denoted as EOF below) or an EOAF primitive (which will be also denoted as EOAF below), or notifies the primitive generator 102 that the CRC value has been calculated. The primitive generator 102 generates EOF or EOAF in response to the request or notification.

The scrambler 106 scrambles input interface data to reduce a deviation of bits. The scrambler 106 scrambles input data by performing an exclusive logical OR (XOR) on a pattern generated by a linear feedback shift register with each bit of the input data to minimize repeated patterns, for example. The scrambler 106 outputs the scrambled interface data to the 32b40b encoder 103. After scrambling the interface data, the scrambler 106 advances to a next state, or the number of times of operations (the number of times of RUNs) of the scrambler 106 is incremented by one.

When the scrambler 106 is notified of transmission of SOF or SOAF by the primitive generator 102, the scrambler 106 is initialized. The scrambler 106 is set in the initial state by the initialization, and thus the number of times of operations of the scrambler 106 is initialized to zero.

The 32b40b encoder 103 performs the 32b40b encode processing on the input information (e.g., a primitive, scrambled frame data, or a CRC value), or performs the 8b10b encode processing every eight bits in the input information thereby to generate 40-bit information. That is, the input 32-bit information is converted into the 40-bit information by the 32b40b encode processing. The 32b40b encoder 103 transmits the generated 40-bit information to another apparatus 30.

With the above operations, the apparatus 30 can transmit the frame to another apparatus 30. Transmission of the frame is notified to the frame control mechanism 115. In response to the notification, the frame control mechanism 115 performs the processing described above by use of the timer 115A and the counter 115B.

When the apparatus 30 receives a frame from another apparatus 30, the controller 101, the 40b32b (10b8b) decoder 107, the primitive decoder 108, the descrambler 109, the CRC decoder 110, and the frame reception controller 111 operate.

The 40b32b decoder 107 performs the 40b32b decode processing on information received from another apparatus thereby to acquire 32-bit information (e.g., a primitive or scrambled frame data). That is, the 32-bit information and a data/primitive indicator are acquired from the received 40-bit information by the 40b32b decode processing. The 40b32b decoder 107 determines which of a primitive and frame data is included in the acquired 32-bit information using the data/primitive indicator. The 40b32b decoder 107 then outputs the information to the primitive decoder 108 when a primitive is included in the information, and outputs the information to the descrambler 109 when frame data (or a CRC value) is included in the information.

The primitive decoder 108 identifies the input primitive, and performs an operation for the primitive in association with the controller 101 or the like. For example, when the identified primitive is SOF or SOAF, the primitive decoder 108 notifies the descrambler 109 of reception of SOF or SOAF. When the identified primitive is EOF or EOAF, the primitive decoder 108 requests the CRC decoder 110 to verify CRC.

The descrambler 109 descrambles the input data. The input data is data scrambled in another apparatus 30 on transmission side. The descrambler 109 descrambles input data by performing an XOR on a pattern generated by a linear feedback shift register with each bit of the input data, for example. The descrambler 109 outputs the descrambled data to the CRC decoder 110. After descrambling the data, the descrambler 109 advances to a next state, or the number of times of operations (the number of times of RUN) of the descrambler 109 is incremented by one.

When the descrambler 109 is notified of the reception of SOF or SOAF by the primitive decoder 108, the descrambler 109 is initialized. The descrambler 109 is set in the initial state by the initialization, and thus the number of times of operations of the descrambler 109 is initialized to zero.

The CRC decoder 110 determines whether a CRC error occurs in the received frame by use of the descrambled frame data and the CRC value in the frame. When notified of reception of EOF or EOAF from the primitive decoder 108, for example, the CRC decoder 110 determines whether a CRC error occurs in the frame.

If the number of times of operations of the scrambler 106 when frame data is scrambled is the same as the number of times of operations of the descrambler 109 when the frame data is descrambled, in other words, if the scrambler 106 is synchronized with the descrambler 109, the descrambler 109 can appropriately descramble the frame data and CRC value. When the frame data and the CRC value are appropriately descrambled, a CRC error due to a loss of synchronization between the scrambler 106 and the descrambler 109 is not detected from the received frame.

On the other hand, if the number of times of operations of the scrambler 106 when frame data is scrambled is not the same as the number of times of operations of the descrambler 109 when the frame data is descrambled, in other words, if the scrambler 106 is not synchronized with the descrambler 109, the descrambler 109 cannot appropriately descramble the frame data or CRC value. When the frame data or CRC value is not appropriately descrambled, the CRC decoder 110 detects a CRC error in the received frame.

When a CRC error does not occur, the CRC decoder 110 outputs the descrambled frame data to the frame reception controller 111. In this case, the frame reception controller 111 processes the input frame data (i.e., the descrambled frame data) in association with the controller 101 or the like. For example, if the apparatus 30 is a storage device, a processing of storing user data into a storage medium, or the like is performed. For example, if the frame is an SSP frame, the controller 101 may control each unit in the apparatus 30 to transmit an ACK primitive indicating acknowledgment in the above-described frame transmission operation. In another example, if the frame is an OPEN address frame for a connection request, the controller 101 may control each unit in the apparatus 30 to transmit an OPEN_ACCEPT primitive indicating accepting the connection request or an OPEN_REJECT primitive indicating rejecting the connection request.

On the other hand, when a CRC error is detected, the CRC decoder 110 notifies the frame reception controller 111 of the detection of the CRC error. For example, when the frame is an SSP frame, the frame reception controller 111 controls each unit in the apparatus 30 to transmit a NAK primitive indicating the occurrence of the reception error through the primitive transmission operation in association with the controller 101 or the like. In another example, when the frame is an address frame, no response is made. A NAK primitive includes a NAK (CRC ERROR) primitive, a NAK (RESERVED 0) primitive, a NAK (RESERVED 1) primitive, or a NAK (RESERVED 2) primitive. The following will mainly assume that a NAK primitive is a NAK (CRC ERROR) indicating an occurrence of a CRC error.

The apparatus 30 can receive a frame from another apparatus 30 in the above operations.

With the configuration, the scrambler 106 is initialized on transmission of SOF or SOAF and the scrambler 106 does not run on transmission of a primitive in the SAS Gen4 apparatus 30. The descrambler 109 is initialized on reception of SOF or SOAF and the descrambler 109 does not run on reception of a primitive in the SAS Gen4 apparatus 30.

To the contrary, the scramblers and the descramblers in the initiator 10 and the target 20 as SAS Gen5 apparatuses are configured as follows in the packet mode, according to the present embodiment.

(1) The scrambler is initialized on transmission of PACKET_SYNC.

(2) The scrambler runs on transmission of a primitive (the number of times of operations is incremented by one).

(3) The descrambler is initialized on reception of PACKET_SYNC.

(4) The descrambler runs on reception of a primitive (the number of times of operations is incremented by one).

FIG. 4 illustrates a configuration of a SAS Gen5 apparatus according to the first embodiment. The apparatus can operate as any of the initiator 10 and the target 20. The SAS Gen5 apparatus will also be denoted as the initiator/target 10, 20 below. The initiator 10 and the target 20 are connected via a SAS Gen5 interface, and can exchange frames that include a primitive or frame data in units of a packet in the packet mode. An address frame, an SSP frame, an SMP frame, and an STP frame are formed of one or more packets, respectively.

Figure 5:
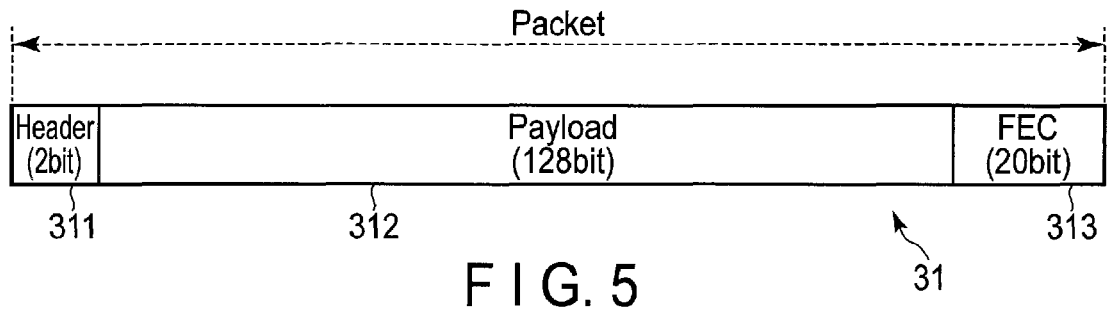
FIG. 5 is a diagram illustrating a configuration of a packet exchanged by the apparatus of the first embodiment.

FIG. 5 illustrates a configuration of a packet (SAS protocol layer (SPL) packet) 31 exchanged between the initiator 10 and the target 20. As illustrated in FIG. 5, a packet has a size of 150 bits, and includes a 2-bit header 311, a 128-bit payload 312, and a 20-bit forward error collection (FEC) code 313.

The header 311 specifies the type of the payload 312. The payload 312 includes any one segment among an idle dword segment, a primitive segment, a scrambled idle segment, and an SPL frame segment.

An idle dword segment includes four idle dwords, and is transmitted outside a frame. A primitive segment includes primitives, binary primitives, a primitive parameter, or an extended binary primitive. A scrambled idle segment includes arbitrary four data dwords. An SPL frame segment includes any one segment among the following four segments: an address frame segment that includes four data dwords of an address frame; an SSP frame segment that includes four data dwords of an SSP frame; an SMP frame segment that includes four data dwords of an SMP frame; and an STP frame segment that includes four data dwords of an STP frame.

The FEC code 313 includes information for error detection and error correction, and employs a Reed-Solomon code, for example.

Returning to FIG. 4, the initiator/target 10, 20 each includes a controller 201, a primitive generator 202, a 128b130b (8b10b) encoder 203, a scrambler 204, an FEC encoder 205, a frame transmission controller 206, a CRC generator 207, an FEC decoder 208, a descrambler 209, a 130b128b (10b8b) decoder 210, a primitive decoder 211, a CRC decoder 212, and a frame reception controller 213.

The controller 201 controls the operations of various components in the initiator/target 10, 20. The controller 201 controls each unit in the initiator/target 10, 20 to transmit a frame to another initiator/target 10, 20, and controls each unit in the initiator/target 10, 20 to receive a frame from another initiator/target 10, 20. The controller 201 includes a frame control mechanism 215. The frame control mechanism 215 has a function of processing for a response depending on a received primitive or frame data, and a timer function of detecting timeout. When a frame is transmitted, the frame control mechanism 215 increments a counter 215B and starts a timer 215A. When a response to the transmitted frame is received, the frame control mechanism 215 decrements the counter 215B. When the counter 215B reaches zero, the timer 215A stops. When the timer 215A detects timeout, the frame control mechanism 215 controls such that a processing for the timeout is performed. The counter 215B indicates a balance between the number of transmitted frames and the number of received responses (e.g., ACK/NAK).

The controller 201 is configured to transmit a frame to another initiator/target 10, 20, to receive a response to the transmitted frame, and to transmit PACKET_SYNC to another initiator/target 10, 20 when the response includes NAK (CRC ERROR) indicating a CRC error, for example. The controller 201 may be configured to enable a function of transmitting PACKET_SYNC when receiving a response indicating a CRC error consecutively N times. N is an integer of one or more.

SAS4 defines that PACKET_SYNC is transmitted at timing according to a scrambler initialization timer or SP-Resync after PHY_Ready (SP state machine SP15). PACKET_SYNC may be transmitted at a vendor specific timing other than the timings defined in SAS4.

The operations of the units in the initiator/target 10, 20 will be described below assuming that a frame is transmitted and that the frame is received.

First, a case in which the initiator/target 10, 20 transmits a frame to another initiator/target 10, 20 will be described. In this case, the controller 201, the primitive generator 202, the 128b130b encoder 203, the scrambler 204, the FEC encoder 205, the frame transmission controller 206, and the CRC generator 207 operate.

The primitive generator 202 generates a primitive, a binary primitive, or an extended binary primitive in response to a request (or, a notification) from the controller 201 or the CRC generator 207. When a primitive is generated, the primitive generator 202 outputs the primitive to the 128b130b encoder 203. When a binary primitive or an extended binary primitive is generated, the primitive generator 202 outputs the binary primitive or the extended binary primitive to the scrambler 204. When PACKET_SYNC is generated, the primitive generator 102 notifies the scrambler 204 that PACKET_SYNC is to be transmitted.

The 128b130b encoder 203 adds a 2-bit header to the input primitive thereby to generate 130-bit information. The 128b130b encoder 203 outputs the generated 130-bit information to the scrambler 204.

The frame transmission controller 206 controls transmission of frame data included in a frame in response to a request from the controller 201. The frame transmission controller 104 outputs the frame data (i.e., 16 data bytes) in units of 128 bits as payload of a packet, and the 2-bit header to the CRC generator 207, for example.

The CRC generator 207 calculates a CRC value of the frame data included in the frame. The CRC generator 207 outputs the frame data and/or the CRC value, and the header to the scrambler 204 in units of a packet. The CRC generator 207 calculates the CRC value by use of all the frame data included in the frame, and then requests the primitive generator 202 to generate a B_EOFs (B_EOF(0), B_EOF(1), B_EOF(2), or B_EOF(3)) primitive (which will be also denoted as B_EOFs below) or an EOAF primitive, and notifies the primitive generator 202 that the CRC value has been calculated. The primitive generator 202 generates B_EOFs or EOAF in response to the request or notification.

More specifically, when requested to generate B_EOFs, the primitive generator 202 generates B_EOF ($PAD) depending on the number of Data dword (which will be also denoted as the number of transmission data items below) included in the frame data in the transmitted frame. $PAD is a variable, and is determined in the following Equation (1).

$$\$PAD=4-(\text{the number of transmission data items mod 4}) \quad \text{Equation (1)}$$

When the size of the frame data in the transmitted frame is not a multiple of four dwords, the variable $PAD indicates the number of pad dwords added to the frame data to allow the size to be a multiple of four dwords. The added pad dwords are not used for calculating the CRC value. Thus, the primitive generator 202 generates B_EOF ($PAD) corresponding to the number of pad dwords added to the frame data such that the transmission destination initiator/target 10, 20 can know the number.

When a primitive, a binary primitive, or an extended binary primitive is input, the scrambler 204 advances to a next state, or the number of times of operations (the number of times of RUN) of the scrambler 204 is incremented by one. The scrambler 204 does not scramble the primitive, the binary primitive, or the extended binary primitive. The scrambler 204 outputs a primitive segment that includes the primitive, the binary primitive, or the extended binary primitive, which is the payload of a transmitted packet, to the FEC encoder 205.

When frame data and/or a CRC value is input, the scrambler 204 scrambles the frame data and/or the CRC value to reduce a deviation of bits. The frame segment including the scrambled frame data and/or the CRC value is the payload of a packet to be transmitted. The payload is added with the 2-bit header. The scrambler 204 outputs the header and the payload to the FEC encoder 205. The scrambler 204 scrambles the frame data, and advances to a next state, or the number of times of operations (the number of times of RUN) of the scrambler 204 is incremented by one.

Figure 6:
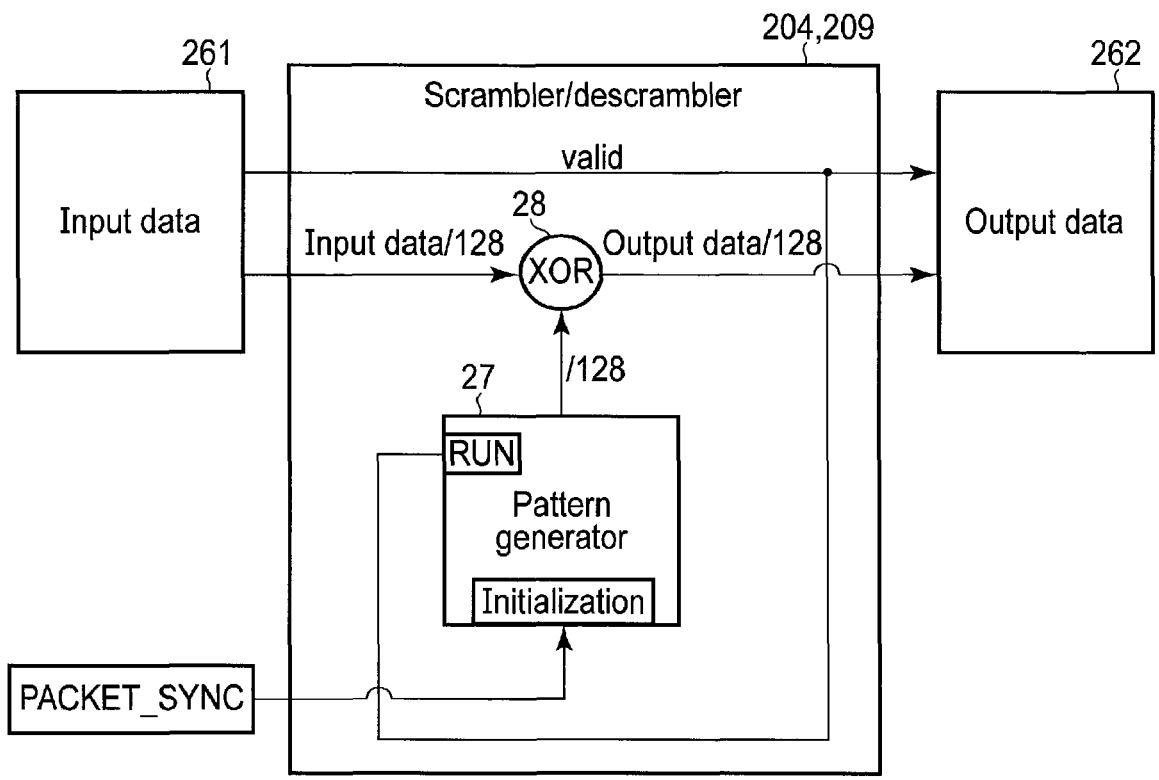
FIG. 6 is a block diagram illustrating the configurations of a scrambler and a descrambler provided in the apparatus of the first embodiment.

FIG. 6 illustrates a configuration of the scrambler 204. The scrambler 204 performs an exclusive logical OR (XOR) calculation 28 on a pattern (signal) generated by a pattern generator 27 and each bit of input data 261 to minimize repeated patterns, thereby acquiring scrambled input data 261 as output data 262. For example, the input data 261 and the output data 262 are 128-bit data, and the pattern generator 27 generates a 128-bit pattern. The pattern generator 27 is a linear feedback shift register, for example, and advances to a next state (or the number of times of operations is incremented by one) in response to a valid signal.

When the scrambler 204 is notified of transmission of PACKET_SYNC by the primitive generator 202, the pattern generator 27 in the scrambler 204 is initialized. The pattern generator 27 is set in the initial state by the initialization, and thus the number of times of operations of the pattern generator 27 is initialized to zero. Initializing the scrambler 204 more specifically means initializing the pattern generator 27 in the scrambler 204.

Returning to FIG. 4, the FEC encoder 205 performs the FEC encode processing on the input information (the header and the payload) thereby to add a 20-bit FEC code, and generates 150-bit information. As described above, the FEC code includes information for error detection and error correction. The FEC encoder 205 transmits a packet formed of the generated 150-bit information to another initiator/target 10, 20.

The initiator/target 10, 20 can transmit the packets configuring a frame to another initiator/target 10, 20 by the above operations. Transmission of the frame is notified to the frame control mechanism 215. In response to the notification, the frame control mechanism 215 performs the processing described above using the timer 215A and the counter 215B.

When the initiator/target 10, 20 receives a frame from another initiator/target 10, 20, the controller 201, the FEC decoder 208, the descrambler 209, the 130b128b (10b8b) decoder 210, the primitive decoder 211, the CRC decoder 212, and the frame reception controller 213 operate.

The FEC decoder 208 performs the FEC decode processing on information (packets) in units of 150 bits received from another initiator/target 10, 20 thereby to generate 130-bit information. The generated 130-bit information includes a header and a payload. The FEC decode processing includes processing for the error detection and error correction using the FEC code. The FEC decoder 208 may notify the controller 201 or the like of success or failure of the decoding. When the decoding is successfully performed, the FEC decoder 208 outputs the generated 130-bit information to the descrambler 209.

When the payload of the input information includes a primitive segment (i.e., a primitive, a binary primitive, or an extended binary primitive), the descrambler 209 advances to a next state, or the number of times of operations of the descrambler 209 is incremented by one. The descrambler 209 does not descramble the primitive segment. When the primitive segment includes a primitive, the descrambler 209 outputs the primitive segment to the 130b128b decoder 210. When the primitive segment includes a binary primitive or an extended binary primitive, the descrambler 209 outputs the primitive segment to the primitive decoder 211.

When the payload of the input information includes a frame segment (i.e., frame data and/or a CRC value), the descrambler 209 descrambles the payload. The descrambler 209 outputs the descrambled frame segment to the CRC decoder 212. After descrambling the frame segment, the descrambler 209 advances to a next state, or the number of times of operations of the descrambler 209 is incremented by one.

The descrambler 209 has a similar configuration to the scrambler 204 described in FIG. 6. That is, the descrambler 209 performs an exclusive logical OR (XOR) calculation 28 on a pattern generated by the pattern generator 27 and each bit of the input data 261, thereby acquiring scrambled input data 261 as output data 262.

When the descrambler 209 is notified of reception of PACKET_SYNC by the primitive decoder 211, the pattern generator 27 in the descrambler 209 is initialized. The pattern generator 27 is set in the initial state by the initialization, and thus the number of times of operations of the pattern generator 27 is initialized to zero. Initializing the descrambler 209 more specifically means initializing the pattern generator 27 in the descrambler 209.

The 130b128b decoder 210 acquires 128-bit information (e.g., a primitive) in which the 2-bit header is excluded from the input information. The 130b128b decoder 210 outputs the acquired 128-bit information to the primitive decoder 211.

The primitive decoder 211 identifies a primitive, a binary primitive, or an extended binary primitive included in the input information, and performs an operation for the primitive, the binary primitive, or the extended binary primitive in association with the controller 101 or the like.

When the input information includes PACKET_SYNC, the primitive decoder 211 notifies the descrambler 209 of reception of PACKET_SYNC.

When the input information includes B_EOFs or EOAF, the primitive decoder 211 requests the CRC decoder 212 to verify CRC.

When the input information includes NAK (CRC ERROR), the primitive decoder 211 controls each unit in the apparatus 30 to transmit an SPL packet that includes PACKET_SYNC in the above described SPL packet transmission operation in association with the controller 201 or the like. PACKET_SYNC is transmitted when NAK (CRC ERROR) indicating a CRC error is received, so that the scrambler 204 in the initiator/target 10, 20 and the descrambler 209 in another initiator/target 10, 20 can be initialized and synchronized.

As described above, when the descrambler 209 is notified of reception of PACKET_SYNC by the primitive decoder 211, the descrambler 209 (more specifically the pattern generator 27) is initialized. The descrambler 209 is set in the initial state by the initialization, and thus the number of times of operations of the descrambler 209 is initialized to zero.

The CRC decoder 212 determines whether a CRC error occurs in the received frame by use of the descrambled frame data and the CRC value in the frame. When notified of reception of B_EOFs or EOAF by the primitive decoder 211, for example, the CRC decoder 212 determines whether a CRC error occurs in the frame.

If the number of times of operations of the scrambler 204 when frame data is scrambled is the same as the number of times of operations of the descrambler 209 when the frame data is descrambled, in other words, if the scrambler 204 is synchronized with the descrambler 209, the descrambler 209 can appropriately descramble the frame data and CRC value. When the frame data and the CRC value are appropriately descrambled, a CRC error due to a loss of synchronization between the scrambler 204 and the descrambler 209 is not detected from the received frame.

On the other hand, if the number of times of operations of the scrambler 204 when frame data is scrambled is not the same as the number of times of operations of the descrambler 209 when the frame data is descrambled, in other words, if the scrambler 204 is not synchronized with the descrambler 209, the descrambler 209 cannot appropriately descramble the frame data or CRC value. When the frame data or CRC value is not appropriately descrambled, the CRC decoder 212 detects a CRC error in the received frame.

When a CRC error is not detected, the CRC decoder 212 outputs the descrambled frame data to the frame reception controller 213. In this case, the frame reception controller 213 processes the input frame data (descrambled frame data) in association with the controller 201 or the like. For example, if the target 20 as storage device receives a frame, the processing of storing user data into a storage medium is performed. In another example, if the frame is an SSP frame, the controller 201 controls each unit in the initiator/target 10, 20 to transmit an SPL packet that includes an ACK indicating acknowledgment in the SPL packet transmission operation. Still in another example, if the frame is an OPEN address frame for connection request, the controller 201 may control each unit in the initiator/target 10, 20 to transmit an SPL packet that includes an OPEN_ACCEPT primitive indicating accepting the connection request or an OPEN_REJECT primitive indicating rejecting the connection request.

On the other hand, when a CRC error is detected, the CRC decoder 212 may discard the frame and may notify the frame reception controller 213 of the detection of the CRC error. For example, when the frame is an SSP frame, the frame reception controller 213 controls each unit in the initiator/target 10, 20 to transmit an SPL packet that includes a NAK (CRC ERROR) primitive indicating the detection of the CRC error in the SPL packet transmission operation in association with the controller 201 or the like. In another example, when the frame is an address frame, no response is made.

The initiator/target 10, 20 can receive a frame from another initiator/target 10, 20 and process the received frame by the above operations. When the received frame includes a response such as ACK or NAK, the reception of the response is notified to the frame control mechanism 215. In response to the notification, the frame control mechanism 215 performs the processing described above using the timer 215A and the counter 215B.

With the configuration explained above, the scrambler 204 is initialized on transmission of PACKET_SYNC and the scrambler 204 runs on transmission of a primitive in the initiator/target 10, 20 according to the present embodiment. The descrambler 209 is initialized on reception of PACKET_SYNC and the descrambler 209 runs on reception of a primitive in the initiator/target 10, 20 according to the present embodiment.

The initiator/target 10, 20 may be further provided with one or more switches 216 for setting the function of transmitting PACKET_SYNC to another initiator/target 10, 20 on or off, per each timing to transmit PACKET_SYNC to another initiator/target 10, 20. The switches 216 are provided for every transmission timing to be set. That is, one or more switches 216 are associated with one or more transmission timings respectively. Setting a switch on/off may be indicated in a value set in a corresponding register, for example. In this case, for example, the controller 201 sets the function of transmitting PACKET_SYNC on or off at timing assigned to a switch 216. The set transmission timings include a timing when NAK (CRC ERROR) indicating a CRC error for the transmitted frame is received, for example.

The controller 201 may be configured to enable the function of transmitting PACKET_SYNC to another initiator/target 10, 20 at the transmission timings respectively associated with the on-set switches 216 when receiving a response indicating a CRC error consecutively N times. The number of times N can be set in the register.

Figure 7:
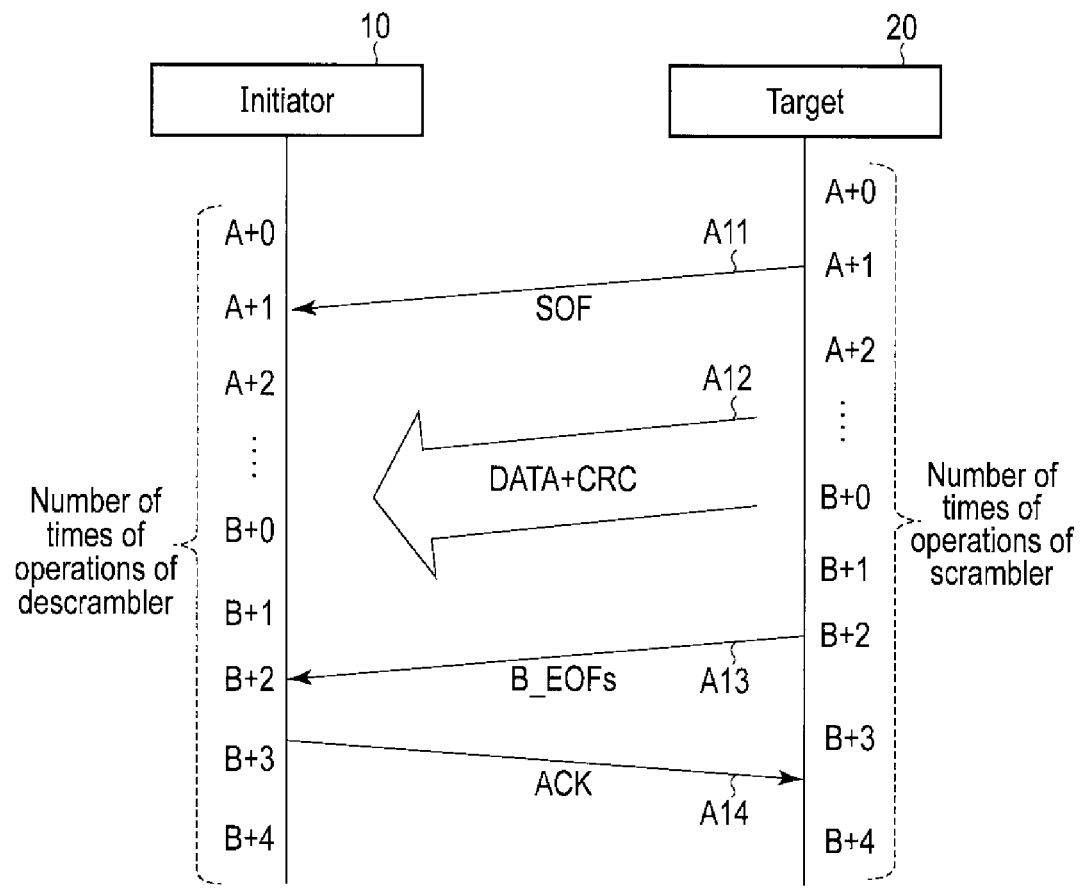
FIG. 7 is an exemplary diagram illustrating a normal frame transmission in the information processing system of FIG. 1.

FIG. 7 illustrates that a frame is correctly transmitted from the target 20 to the initiator 10 by way of example. A frame to be transmitted is an SSP frame, an SMP frame, or an STP frame.

Exchange of a primitive and frame data will be described when an SSP frame is transmitted from the target 20 to the initiator 10 by way of example. It is assumed herein that before an SSP frame is transmitted, the scrambler 204 in the target 20 is synchronized with the descrambler 209 in the initiator 10. As illustrated in FIG. 7, before an SSP frame starts being transmitted, the number of times of operations (the number of times of RUN) of the scrambler 204 in the target 20 is the same as the number of times of operations of the descrambler 209 in the initiator 10, i.e., the number of times of operations is A+0.

When an SSP frame is transmitted from the target 20 to the initiator 10, the target 20 first transmits a packet that includes SOF indicating the start of the SSP frame and the initiator 10 receives the packet (A11). The number of times of operations of the scrambler 204 in the target 20 and the number of times of operations of the descrambler 209 in the initiator 10 are incremented by one from A+0 to A+1 on the exchange. That is, the scrambler 204 in the target 20 advances to a next state and the descrambler 209 in the initiator 10 advances to a next state.

The target 20 then transmits one or more packets including frame data and CRC, and the initiator 10 receives the one or more packets (A12). The number of times of operations of the scrambler 204 in the target 20 and the number of times of operations of the descrambler 209 in the initiator 10 are incremented by one, respectively, on exchange of each packet included in the one or more packets. In the example of FIG. 7, on the exchange of the one or more packets, the number of times of operations of the scrambler 204 in the target 20 and the number of times of operations of the descrambler 209 in the initiator 10 increment from A+1 to B+1.

After the one or more packets including frame data and CRC are transmitted, the target 20 transmits a packet including B_EOFs indicating completed transmission of the SSP frame, and the initiator 10 receives the packet (A13). On the exchange, the number of times of operations of the scrambler 204 in the target 20 and the number of times of operations of the descrambler 209 in the initiator 10 are incremented by one, from B+1 to B+2.

The initiator 10 which receives the packet including B_EOFs verifies CRC, and transmits a packet including ACK if a CRC error is not detected, and the target 20 receives the packet (A14). Though not illustrated, the number of times of operations of the scrambler 204 in the initiator 10 and the number of times of operations of the descrambler 209 in the target 20 are incremented by one, respectively, on the exchange.

The number of times of operations of the scrambler 204 in the target 20 matches with the number of times of operations of the descrambler 209 in the initiator 10 in the above packet exchange, and thus the scrambler 204 in the target 20 is synchronized with the descrambler 209 in the initiator 10. Thus, a CRC error due to a loss of synchronization between the scrambler 204 in the target 20 and the descrambler 209 in the initiator 10 does not occur, and the initiator 10 can correctly receive the SSP frame.

By replacing the explanation of initiator 10 and target 20 with each other, packets can be exchanged also when an SSP frame is transmitted from the initiator 10 to the target 20.

Figure 8:
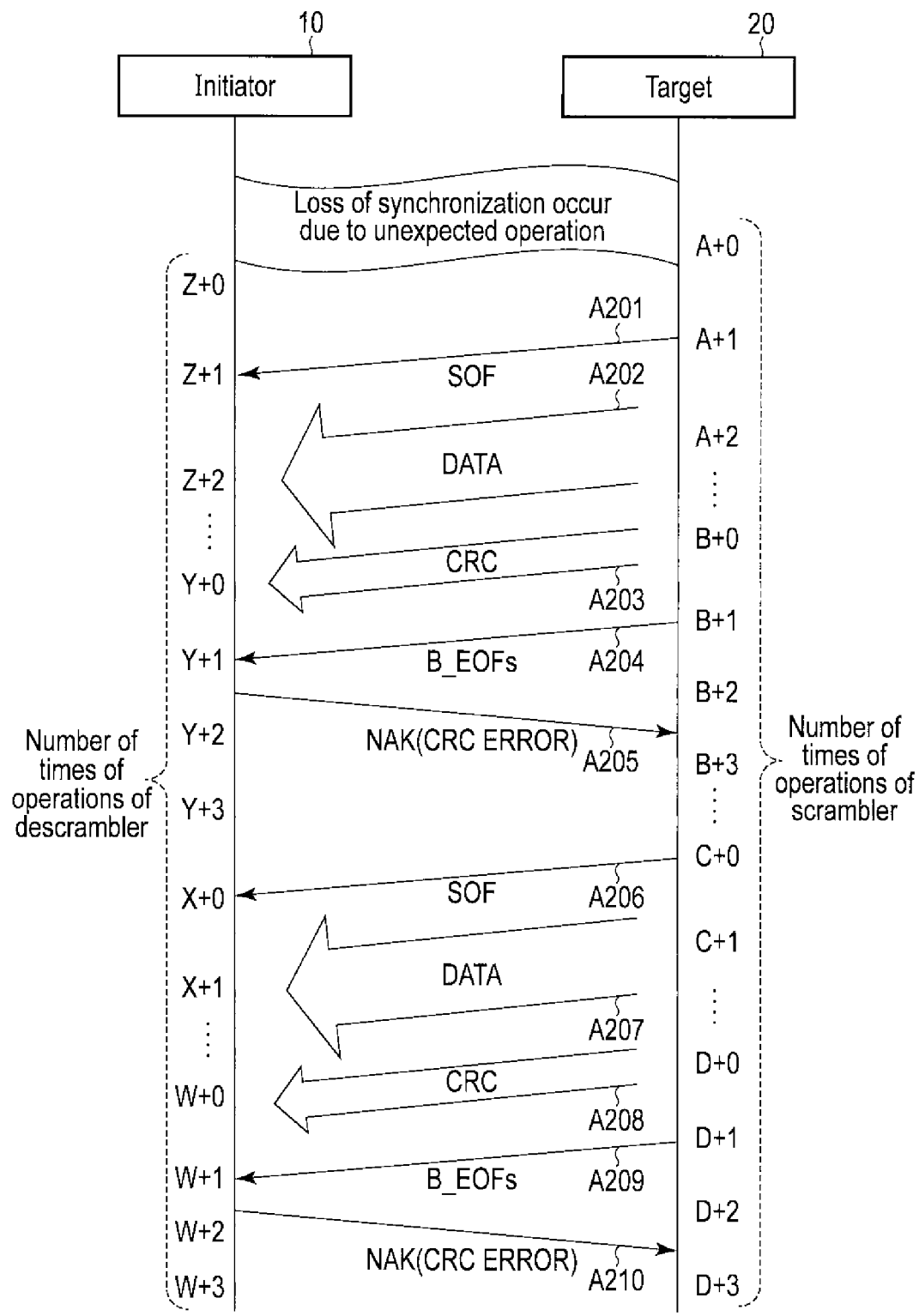
FIG. 8 is an exemplary diagram illustrating that CRC errors are caused in a series in transmitting frames in the information processing system of FIG. 1.

On the other hand, FIG. 8 illustrates that an SSP frame is not correctly transmitted from the target 20 to the initiator 10 by way of example. It is assumed herein that before an SSP frame is transmitted, a loss of synchronization between the scrambler 204 in the target 20 and the descrambler 209 in the initiator 10 occurs due to an unexpected operation. As illustrated in FIG. 8, before the SSP frame starts being transmitted, the number of times of operations of the scrambler 204 in the target 20 is A+0, and the number of times of operations of the descrambler 209 in the initiator 10 is Z+0, which is different from A+0.

When an SSP frame is transmitted from the target 20 to the initiator 10, the target 20 first transmits a packet that includes SOF indicating the start of the SSP frame, and the initiator 10 receives the packet (A201). On the exchange, the number of times of operations of the scrambler 204 in the target 20 is incremented by one, from A+0 to A+1, and the number of times of operations of the descrambler 209 in the initiator 10 is incremented by one, from Z+0 to Z+1. That is, the scrambler 204 in the target 20 advances to a next state and the descrambler 209 in the initiator 10 advances to a next state.

The target 20 then transmits one or more packets including frame data and CRC, and the initiator 10 receives the one or more packets (A202, A203). On exchange of each packet included in the one or more packets, the number of times of operations of the scrambler 204 in the target 20 and the number of times of operations of the descrambler 209 in the initiator 10 are incremented by one, respectively. In the example of FIG. 8, on the exchange of the one or more packets, the number of times of operations of the scrambler 204 in the target 20 increments from A+1 to B+0, and the number of times of operations of the descrambler 209 in the initiator 10 increments from Z+1 to Y+0.

After the one or more packets including frame data and CRC are transmitted, the target 20 transmits a packet that includes B_EOFs indicating completed transmission of the frame, and the initiator 10 receives the packet (A204). On the exchange, the number of times of operations of the scrambler 204 in the target 20 increments from B+0 to B+1, and the number of times of operations of the descrambler 209 in the initiator 10 increments from Y+0 to Y+1.

The initiator 10 which receives the packet including B_EOFs verifies CRC, discards the SSP frame since a CRC error occurs, and transmits a packet including NAK (CRC ERROR), and the target 20 receives the packet (A205). Though not illustrated, on the exchange, the number of times of operations of the scrambler 204 in the initiator 10 and the number of times of operations of the descrambler 209 in the target 20 are incremented by one, respectively.

On the exchanges of the packets in A201 to A204, the number of times of operations of the scrambler 204 in the target 20 does not match with the number of times of operations of the descrambler 209 in the initiator 10, and thus the scrambler 204 in the target 20 is not synchronized with the descrambler 209 in the initiator 10. Thus, a CRC error due to a loss of synchronization between the scrambler 204 in the target 20 and the descrambler 209 in the initiator 10 occurs, and the initiator 10 cannot correctly receive the SSP frame.

Thereafter, also when packets are exchanged to further transmit an SSP frame from the target 20 to the initiator 10 (A206 to A210), the scrambler 204 in the target 20 is not synchronized with the descrambler 209 in the initiator 10, and thus a CRC error due to the loss of synchronization between the scrambler 204 in the target 20 and the descrambler 209 in the initiator 10 repeatedly occurs.

According to the present embodiment, the initiator 10 is synchronized with the target 20 by use of PACKET_SYNC to prevent a CRC error due to a loss of synchronization between the scrambler 204 and the descrambler 209 from occurring repeatedly. More specifically, PACKET_SYNC is transmitted from the target 20 to the initiator 10 thereby to initialize and synchronize the scrambler 204 in the target 20 and the descrambler 209 in the initiator 10. Also PACKET_SYNC is transmitted from the initiator 10 to the target 20 thereby to initialize and synchronize the scrambler 204 in the initiator 10 and the descrambler 209 in the target 20.

Figure 9:
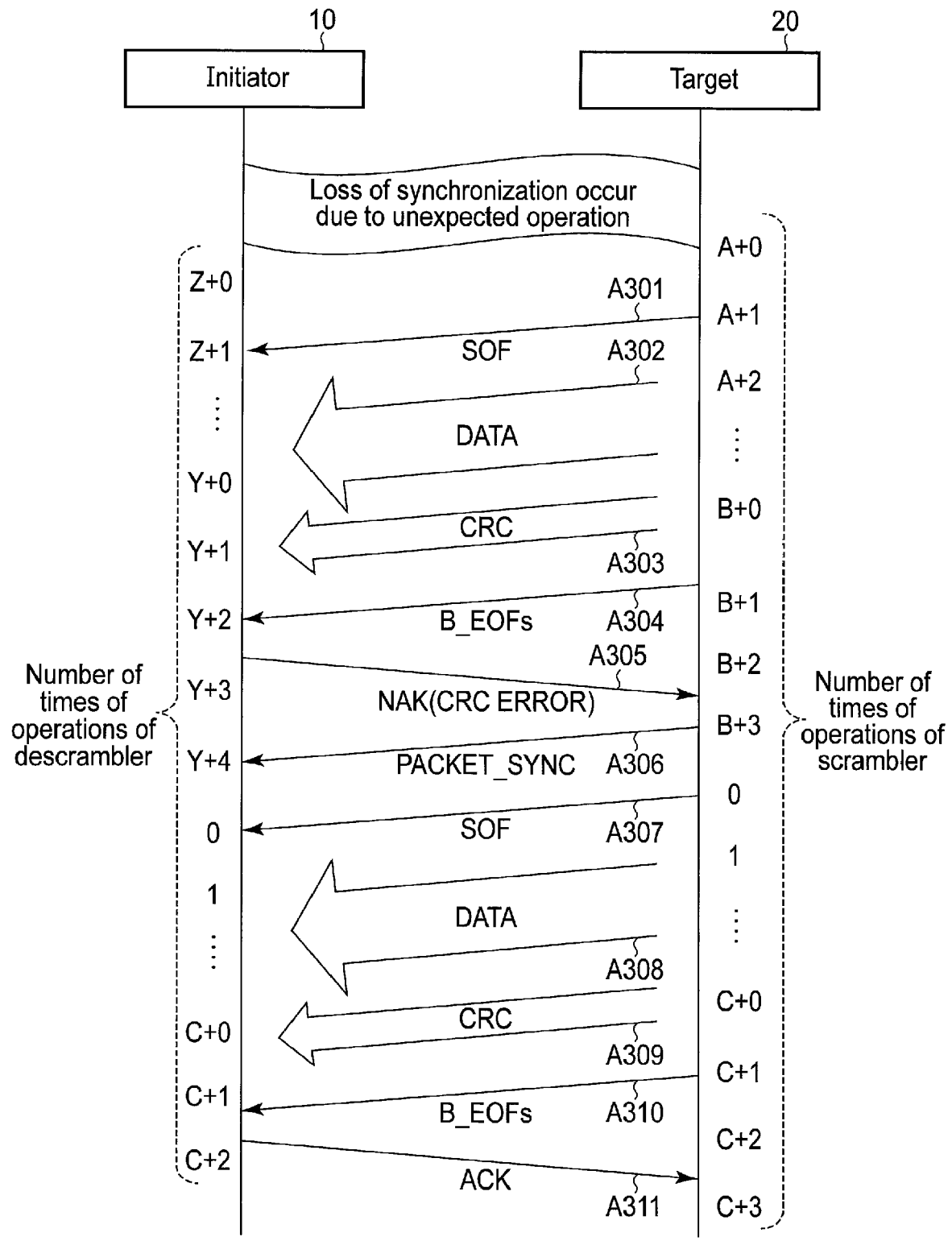
FIG. 9 is an exemplary diagram illustrating that PACKET_SYNC is transmitted on reception of a primitive indicating a CRC error in the information processing system of FIG. 1.

FIG. 9 illustrates that PACKET_SYNC is transmitted on reception of a primitive such as NAK (CRC ERROR) indicating a CRC error by way of example.

Exchanging the packets to transmit the SSP frame in A301 to A304 is similar to exchanging the packets in A201 to A204 illustrated in FIG. 8. As in A205 in FIG. 8, the initiator 10 which receives the packet including B_EOFs verifies CRC, and transmits a packet including NAK (CRC ERROR) since a CRC error occurs, and the target 20 receives the packet (A305).

The target 20 which receives the packet including NAK (CRC ERROR) then transmits a packet including PACKET_SYNC and the initiator 10 receives the packet (A306). On the transmission of PACKET_SYNC, the number of times of operations of the scrambler 204 in the target 20 increments from B+2 to B+3, and is then initialized to zero. On the reception of PACKET_SYNC, the number of times of operations of the descrambler 209 in the initiator 10 increments from Y+3 to Y+4 and is then initialized to zero. Thus, the scrambler 204 in the target 20 is synchronized with the descrambler 209 in the initiator 10 by the initialization on the exchange of PACKET_SYNC.

Then, when an SSP frame is further transmitted from the target 20 to the initiator 10, the target 20 transmits a packet that includes SOF indicating the start of the frame, and the initiator 10 receives the packet (A307). On the exchange, the number of times of operations of the scrambler 204 in the target 20 and the number of times of operations of the descrambler 209 in the initiator 10 are incremented by one, from zero to one.

The target 20 then transmits one or more packets including frame data and CRC, and the initiator 10 receives the one or more packets (A308, A309). The number of times of operations of the scrambler 204 in the target 20 and the number of times of operations of the descrambler 209 in the initiator 10 are incremented by one, respectively, on exchange of each packet included in the one or more packets. In the example of FIG. 9, on the exchanges of the one or more packets, the number of times of operations of the scrambler 204 in the target 20 and the number of times of operations of the descrambler 209 in the initiator 10 increment from 1 to C+0.

After the one or more packets including frame data and CRC are transmitted, the target 20 transmits a packet that includes B_EOFs indicating completed transmission of the SSP frame, and the initiator 10 receives the packet (A310). On the exchange, the number of times of operations of the scrambler 204 in the target 20 and the number of times of operations of the descrambler 209 in the initiator 10 are incremented by one, from C+0 to C+1.

The initiator 10 which receives the packet including B_EOFs verifies CRC, and transmits a packet including ACK since a CRC error does not occur, and the target 20 receives the packet (A311). Though not illustrated, on the exchange, the number of times of operations of the scrambler 204 in the initiator 10 and the number of times of operations of the descrambler 209 in the target 20 are incremented by one, respectively.

As described above, when receiving NAK (CRC ERROR) from the initiator 10, the target 20 transmits PACKET_SYNC to the initiator 10. Thereby, the scrambler 204 in the target 20 and the descrambler 209 in the initiator 10 are initialized and synchronized. Thus, on subsequent exchanges of packets, a CRC error due to a loss of synchronization between the scrambler 204 in the target 20 and the descrambler 209 in the initiator 10 does not occur, and the initiator 10 can correctly receive the SSP frame.

By replacing the explanation of initiator 10 and target 20 with each other, an SSP frame can be transmitted correctly from the initiator 10 to the target 20.

The procedures of a transmission control processing, a response control processing, a frame control processing, and a reception control processing performed by the initiator 10 or the target 20 will be described with reference to the flowcharts of FIG. 10 to FIG. 15. There will be described below an example in which a frame is transmitted from the target 20 to the initiator 10 for simple description, but by replacing the description of target 20 and initiator 10 with each other, a frame can be similarly transmitted from the initiator 10 to the target 20.

Figure 10:
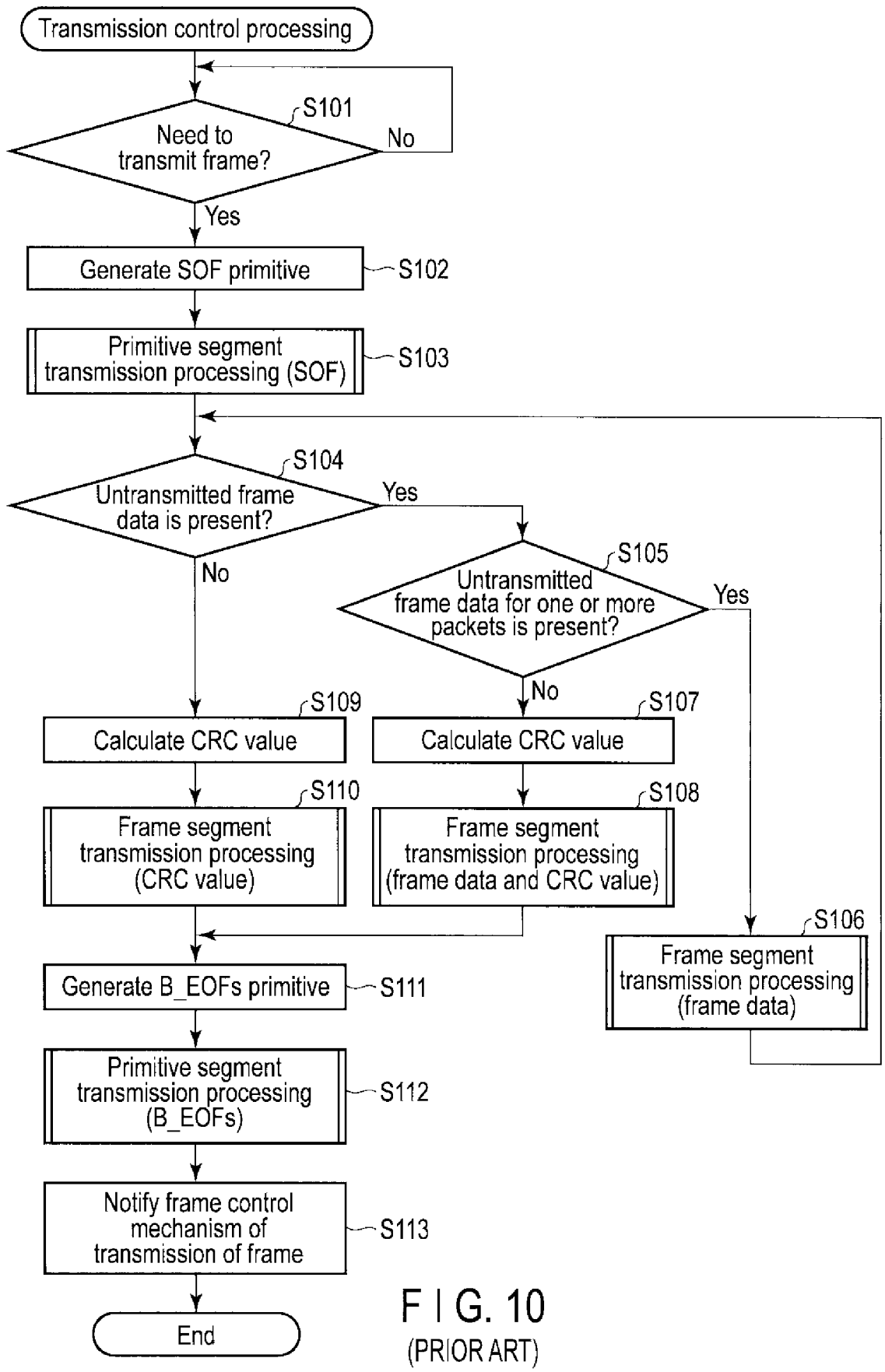
FIG. 10 is a flowchart illustrating an exemplary procedure of a transmission control processing performed by the apparatus of the first embodiment.

The flowchart of FIG. 10 illustrates an exemplary procedure of the transmission control processing performed by the target 20. The target 20 is configured to transmit PACKET_SYNC when receiving NAK (CRC ERROR) from the initiator 10 for a transmitted frame.

The target 20 first determines whether it needs to transmit a frame to the initiator 10 (step S101). When the target 20 does not need to transmit a frame (NO in step S101), the processing returns to step S101, where a determination is made again as to whether the target 20 needs to transmit a frame to the initiator 10. In this case, the target 20 may transmit a packet including an idle dword segment to the initiator 10, for example.

When the target 20 needs to transmit a frame (YES in step S101), the target 20 generates SOF (step S102), and performs a primitive segment transmission processing for transmitting a packet including SOF to the initiator 10 (step S103). The primitive segment transmission processing will be described below with reference to the flowchart of FIG. 12.

The target 20 then determines whether untransmitted frame data configuring the frame is present (step S104). When untransmitted frame data is present (YES in step S104), the target 20 determines whether untransmitted frame data for one or more packets is present (step S105). Frame data for one packet corresponds to four dwords, for example. When untransmitted frame data for one or more packets is present (YES in step S105), the target 20 performs a frame segment transmission processing for transmitting a packet including a frame segment formed of the untransmitted frame data to the initiator 10 (step S106), and returns to step S104. The frame segment transmission processing will be described below with reference to FIG. 13.

When untransmitted frame data for one or more packets is not present (NO in step S105), the target 20 calculates a CRC value of the frame data configuring the frame (step S107). The target 20 then performs the frame segment transmission processing for transmitting a packet including a frame segment formed of the untransmitted frame data and the calculated CRC value to the initiator 10 (step S108).

Further, when untransmitted frame data is not present (NO in step S104), for example, when all the frame data configuring the frame is already transmitted to the initiator 10, the target 20 calculates a CRC value of the frame data configuring the frame (step S109). The target 20 then performs the frame segment transmission processing for transmitting a packet including a frame segment formed of the calculated CRC value and, if any, one or more pad dwords to the initiator 10 (step S110).

After all the frame data configuring the frame and the CRC value are transmitted to the initiator 10 in units of a packet (after step S108 or step S110), the target 20 generates B_EOFs indicating completed transmission of the frame (step S111), and performs the primitive segment transmission processing for transmitting a packet including B_EOFs to the initiator 10 (step S112). The target 20 (more specifically the frame transmission controller 206) then notifies the frame control mechanism 215 in the controller 201 of transmission of the frame (step S113), and terminates the processing. The operations of the frame control mechanism 215 will be described below with reference to the flowchart of FIG. 14.

The flowchart of FIG. 11 illustrates an exemplary procedure of the response control processing performed by the target 20.

The target 20 first determines whether it has received a response from the initiator 10 (step S121). When the target 20 has not received a response (NO in step S121), the processing returns to step S121, where a determination is made again as to whether the target 20 has received a response.

When the target 20 has received a response (YES in step S121), the target 20 (more specifically the primitive decoder 211) notifies the frame control mechanism 215 in the controller 201 of reception of the response (step S122). The operations of the frame control mechanism 215 will be described below with reference to the flowchart of FIG. 14. The target 20 then determines the type of the response (step S123). When the response is ACK (ACK in step S123), the processing is terminated.

On the other hand, when the response is NAK (CRC ERROR) (NAK (CRC ERROR) in step S123), the target 20 generates PACKET_SYNC (step S124), and performs the primitive segment transmission processing for transmitting a packet including PACKET_SYNC to the initiator 10 (step S125). The target 20 then initializes the scrambler 204 (step S126), and terminates the processing. The number of times of operations of the scrambler 204 is initialized to zero by the initialization.

As described above, when the response for the transmitted frame is NAK (CRC_ERROR) indicating a CRC error, PACKET_SYNC is transmitted to initialize the scrambler 204 in the target 20 and the descrambler 209 in the initiator 10 thereby to synchronize the scrambler 204 in the target 20 and the descrambler 209 in the initiator 10. Thus, it is possible to prevent a CRC error from occurring repeatedly.

Figure 12:
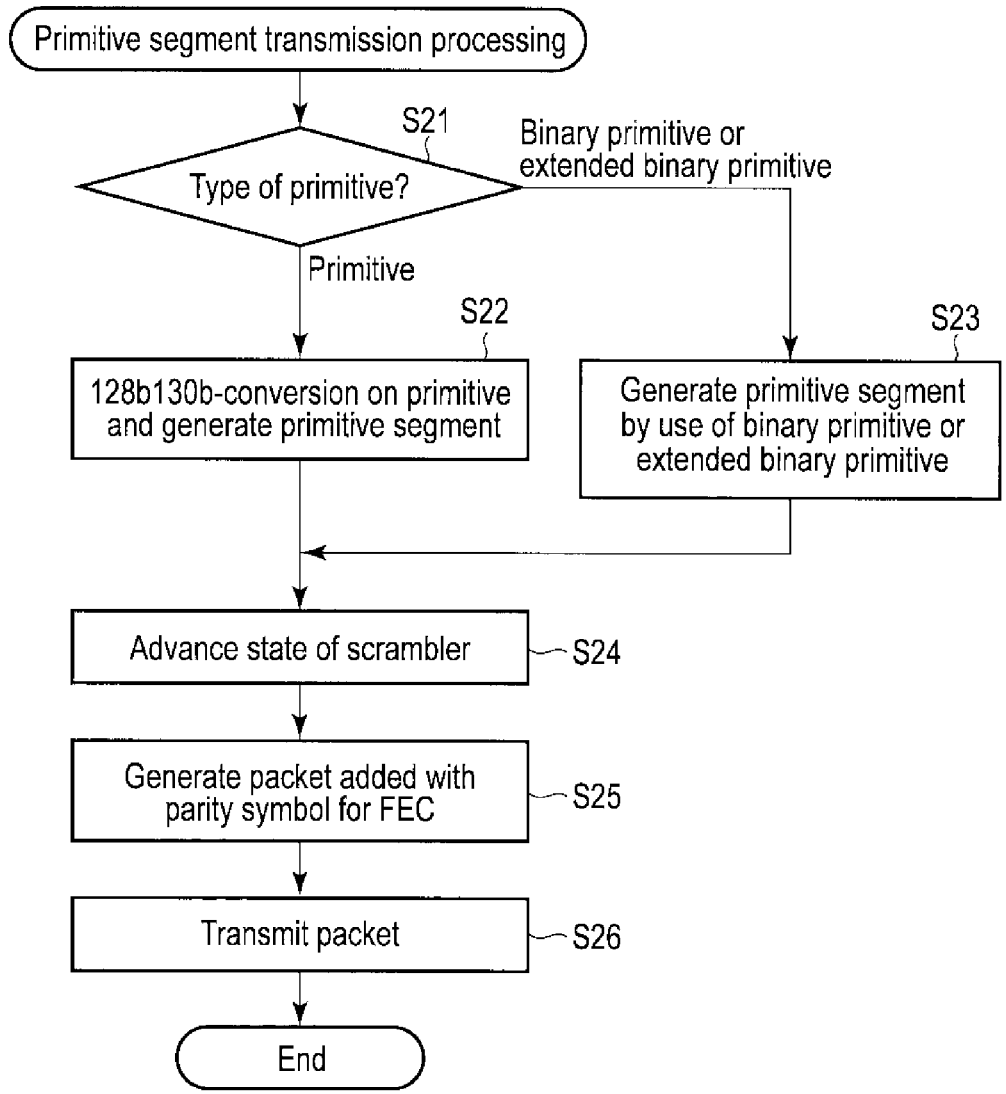
FIG. 12 is a flowchart illustrating an exemplary procedure of a primitive segment transmission processing performed by the apparatus of the first embodiment.

The flowchart of FIG. 12 illustrates an exemplary procedure of the primitive segment transmission processing performed by the target 20.

First, a processing in the target 20 branches depending on the type of a primitive to be transmitted (step S21). When a primitive is to be transmitted (primitive in step S21), the target 20 performs a 128b130b-conversion on the primitive and generates a primitive segment (step S22). On the other hand, when a binary primitive or an extended binary primitive is to be transmitted (binary primitive or extended binary primitive in step S21), the target 20 generates a primitive segment by use of the binary primitive or extended binary primitive (step S23).

The target 20 then advances the state of the scrambler 204 to a next state (step S24). That is, the target 20 increments the number of times of operations (the number of times of RUN) of the scrambler 204 by one.

The target 20 then generates a packet added with a parity symbol for FEC (step S25), and transmits the packet to the initiator 10 (step S26).

As described above, a packet including a primitive, a binary primitive, or an extended binary primitive can be transmitted. The scrambler 204 does not scramble the primitive, binary primitive, or extended binary primitive, but advances to a next state.

Figure 13:
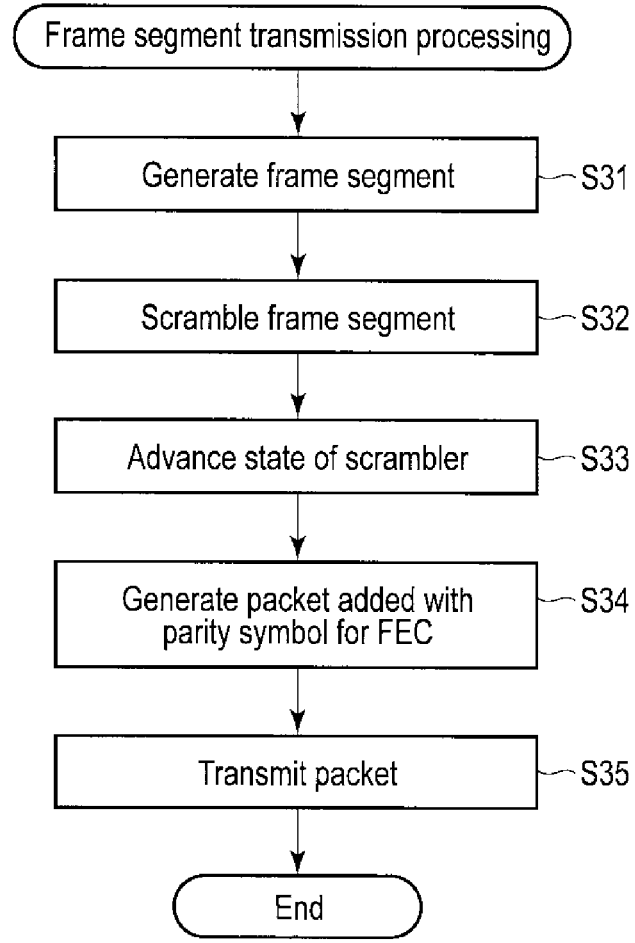
FIG. 13 is a flowchart illustrating an exemplary procedure of a frame segment transmission processing performed by the apparatus of the first embodiment.

The flowchart of FIG. 13 illustrates an exemplary procedure of the frame segment transmission processing performed by the target 20.

The target 20 first generates a frame segment that includes at least one of frame data and a CRC value to be transmitted (step S31). The target 20 scrambles the frame segment with the scrambler 204 (step S32). The target 20 then advances the state of the scrambler 204 to a next state (step S33).

The target 20 then generates a packet added with a parity symbol for FEC (step S34), and transmits the packet to the initiator 10 (step S35).

As described above, a packet that includes at least one of frame data and a CRC value can be transmitted. The scrambler 204 scrambles the frame data and the CRC value, and the scrambler 204 advances to a next state.

Figure 14:
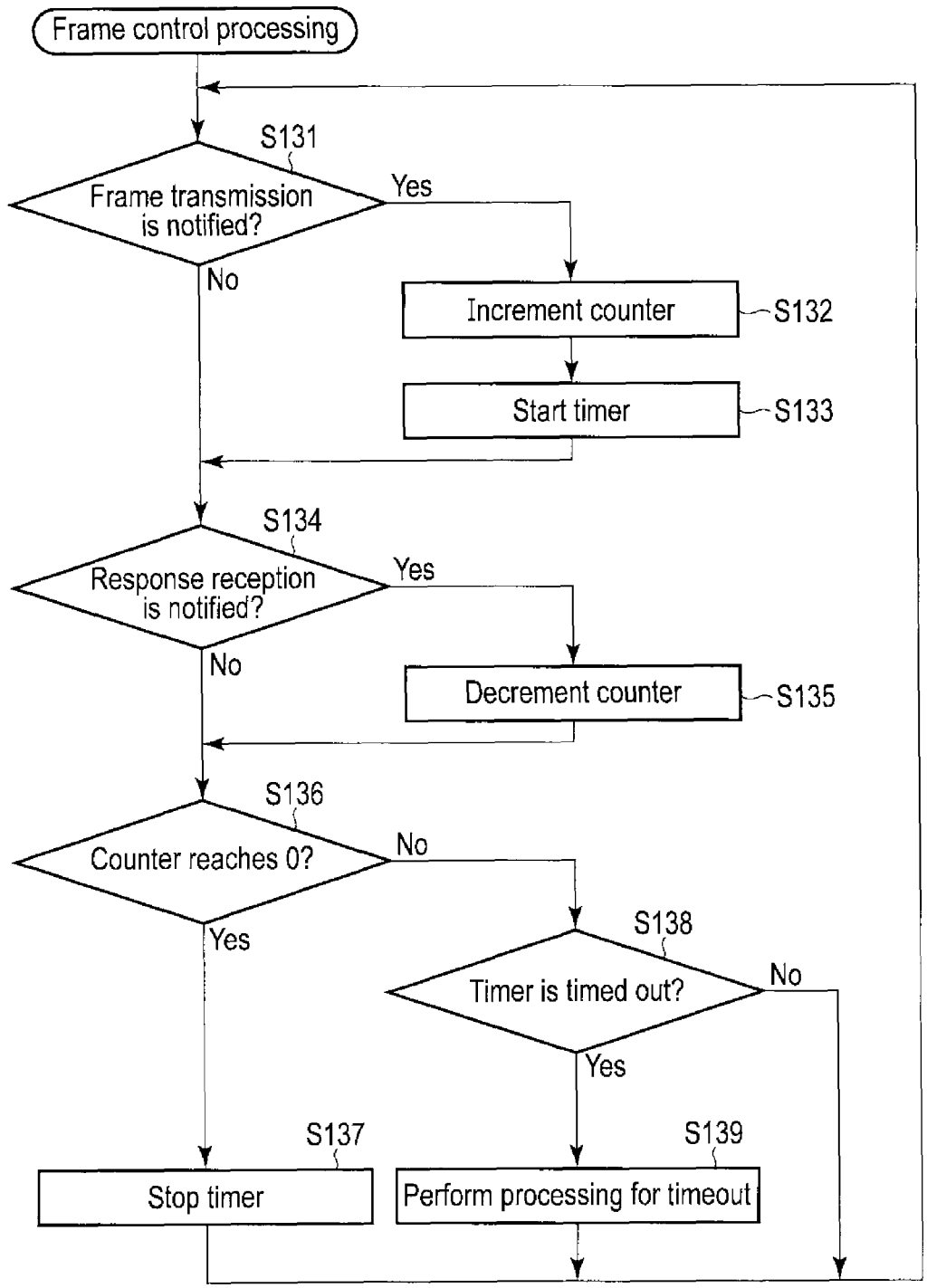
FIG. 14 is a flowchart illustrating an exemplary procedure of a frame control processing performed by the apparatus of the first embodiment.

The flowchart of FIG. 14 illustrates an exemplary procedure of the frame control processing performed by the target 20. More specifically, the frame control processing is realized by the operations of the frame control mechanism 215 in the controller 201.

At first, the target 20 (the frame control mechanism 215) determines whether transmission of a frame has been notified (step S131). When transmission of the frame has been notified (YES in step S131), the target 20 increments the counter 215B, i.e., increases the value of the counter 215B by one (step S132). The counter 215B indicates a balance between the number of transmitted frames and the number of received responses (e.g., ACK/NAK). The target 20 then starts the timer 215A (step S133).

On the other hand, when transmission of the frame has not been notified (NO in step S131), or after step S133, the target 20 determines whether reception of a response has been notified (step S134). When reception of the response has been notified (YES in step S134), the target 20 decrements the counter 215B, i.e., decreases the value of the counter 215B by one (step S135).

When reception of the response has not been notified (NO in step S134), or after step S135, the target 20 determines whether the counter 215B reaches zero (step S136). When the counter 215B reaches zero (YES in step S136), the target 20 stops the timer 215A (step S137), and returns to step S131.

When the counter 215B does not reach zero (NO in step S136), the target 20 determines whether the timer 215A has timed out (step S138). When the timer 215A has timed out (YES in step S138), the target 20 performs the processing for the timeout (step S139), and returns to step S131. On the other hand, when the timer 215A has not timed out (NO in step S138), the target 20 returns to step S131.

As described above, the timer 215A can be controlled in its start/stop on transmission of a frame and reception of a response, and a proper processing can be performed when timeout occurs.

An exemplary procedure of the reception control processing performed by the initiator 10 will be described with reference to the flowchart of FIG. 15.

At first, the initiator 10 determines whether it has received a packet from the target 20 (step S401). When the initiator 10 has not received a packet (NO in step S401), the processing returns to step S401, where a determination is made again as to whether the initiator 10 has received a packet.

When having received a packet (YES in step S401), the initiator 10 performs the FEC decode processing on the packet (step S402). In the FEC decode processing, for example, determination of the presence of an error, specification of an error position, correction of an error, and notification of success or failure of decoding are performed.

When having successfully performed the FEC decode processing, the initiator 10 determines whether the segment included in the decoded packet is a primitive segment (step S403). When the segment included in the packet is not a primitive segment (NO in step S403), the initiator 10 descrambles the segment (step S404). The initiator 10 then advances the state of the descrambler 209 to a next state (step S405), i.e., increments the number of times of operations (the number of times of RUN) of the descrambler 209 by one, and returns to step S401. The segment which is not a primitive segment may be any of an SPL frame segment, an idle dword segment, and a scrambled idle segment.

On the other hand, when the segment included in the packet is a primitive segment (YES in step S403), the initiator 10 advances the state of the descrambler 209 to a next state (step S406). When the primitive segment includes a primitive (primitive in step S407), the initiator 10 performs a 130b128b-conversion on the primitive segment (step S408). When the primitive segment includes a binary primi-tive or an extended binary primitive (binary primitive or extended binary primitive in step S407), step S408 is skipped.

The initiator 10 then determines whether the primitive segment includes PACKET_SYNC (step S409). When the primitive segment includes PACKET_SYNC (YES in step S409), the initiator 10 initializes the descrambler 209 (step S410), and returns to step S401. The number of times of operations of the descrambler 209 is initialized to zero by the initialization.

When the primitive segment does not include PACKET_SYNC (NO in step S409), the initiator 10 determines whether the primitive segment includes B_EOFs indicating completed transmission of the frame (step S411). B_EOFs is B_EOF(0), B_EOF(1), B_EOF(2), B_EOF(3), B_EOF(0) (RESERVED 1), B_EOF(1) (RESERVED 1), B_EOF(1) (RESERVED 2), B_EOF(2) (RESERVED 1), B_EOF(2) (RESERVED 2), B_EOF(3) (RESERVER 1), or B_EOF(3) (RESERVED 2). When the primitive segment includes B_EOFs (YES in step S411), the initiator 10 verifies the CRC value of the frame (step S412), and determines whether a CRC error occurs in the frame (step S413).

When a CRC error occurs (YES in step S413), the initiator 10 discards the frame, and generates NAK (CRC ERROR) (step S414). The initiator 10 then performs the primitive segment transmission processing for transmitting a packet including NAK (CRC ERROR) to the target 20 (step S415), and returns to step S401. The primitive segment transmission processing is as in the flowchart of FIG. 12.

When a CRC error does not occur (NO in step S413), the initiator 10 generates ACK (step S416), performs the primitive segment transmission processing for transmitting a packet including ACK to the target 20 (step S417), and returns to step S401.

When the primitive segment does not include B_EOFs (NO in step S411), the initiator 10 performs an operation for a primitive included in the primitive segment (step S418), and returns to step S401.

As described above, it is possible to prevent an error from occurring in a subsequent frame.

(Second Embodiment)

The initiator 10 and the target 20 transmit PACKET_SYNC on reception of a primitive indicating a CRC error according to the first embodiment. To the contrary, according to a second embodiment, an initiator 10 and a target 20 transmit PACKET_SYNC on detection of timeout. The timeout occurs due to an error on transmission of an address frame, for example. The address frame is an IDENTIFY address frame used for initialization or an OPEN address frame used for connection request.

A configuration of an information processing system 1 according to the second embodiment is similar to the configuration of the information processing system 1 according to the first embodiment, and the second embodiment is different from the first embodiment only in the procedures of the processing performed by a controller 201. Only the differences from the first embodiment will be described below.

The controller 201 is configured to transmit an address frame to another initiator/target 10, 20 and to transmit PACKET_SYNC to another initiator/target 10, 20 when detecting that a timer expires for the address frame. The controller 201 may be configured to enable a function of transmitting PACKET_SYNC to another initiator/target 10, 20 when an address frame is transmitted expiry of the timer for the address frame is detected consecutively N times. As described above, the controller 201 has the timer function.

The controller 201 can start the timer on transmission of an address frame, and can detect whether it receives a response for the address frame until expiry of the timer (one millisecond after transmission of the address frame, for example). When a response is not received until expiry of the timer, the timeout is detected.

Figure 16:
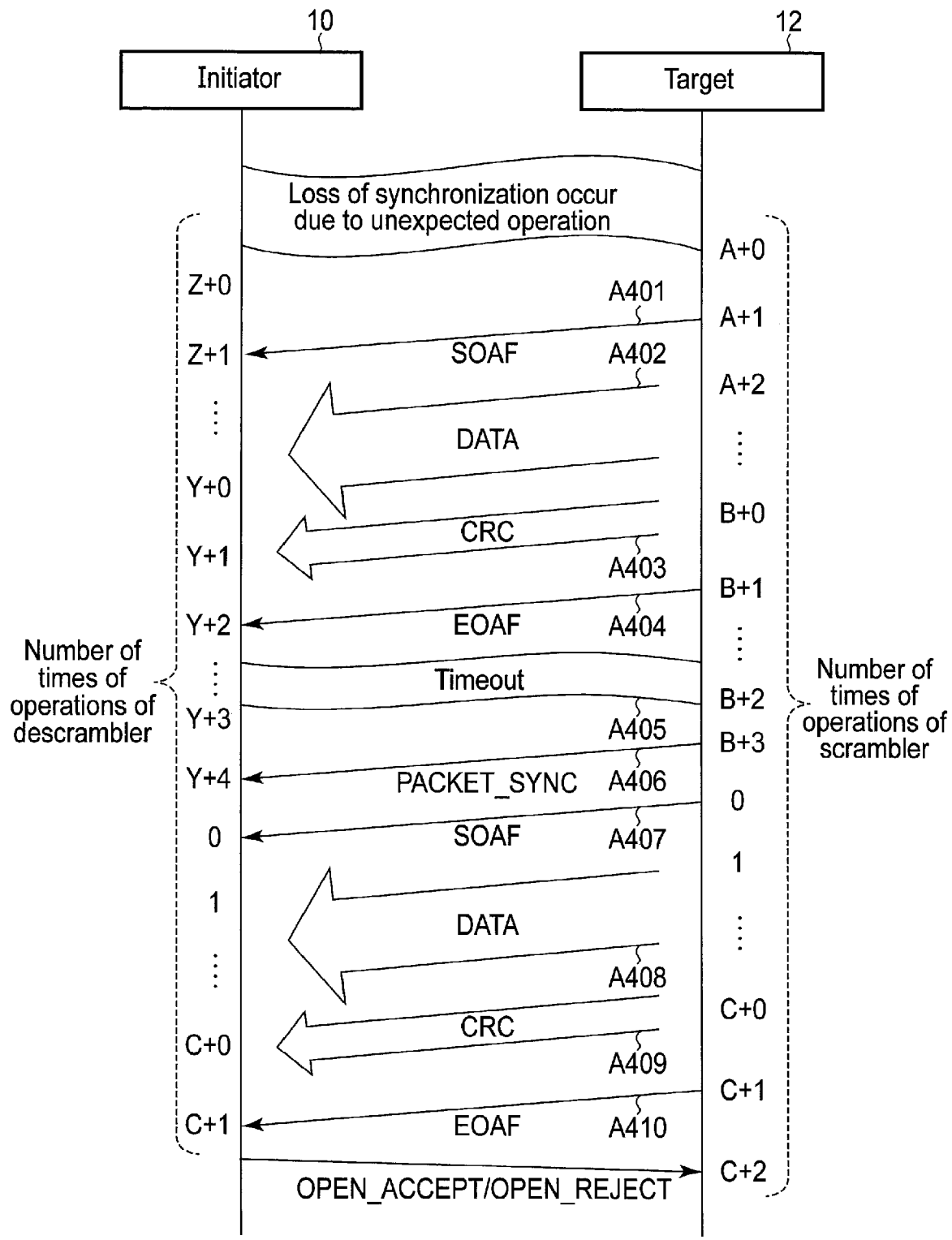
FIG. 16 is an exemplary diagram illustrating that PACKET_SYNC is transmitted after a timeout is detected in an information processing system including an apparatus according to a second embodiment.

FIG. 16 illustrates that PACKET_SYNC is transmitted in response to detection of timeout by way of example. It is assumed herein that a loss of synchronization between a scrambler 204 in the target 20 and a descrambler 209 in the initiator 10 occurs due to an unexpected operation before an address frame is transmitted. As illustrated in FIG. 16, before an address frame starts being transmitted, the number of times of operations of the scrambler 204 in the target 20 is A+0, the number of times of operations of the descrambler 209 in the initiator 10 is Z+0, which is different from A+0.

When an address frame is transmitted from the target 20 to the initiator 10, the target 20 first transmits a packet that includes SOAF indicating the start of the address frame, and the initiator 10 receives the packet (A401). On the exchange, the number of times of operations of the scrambler 204 in the target 20 is incremented by one, from A+0 to A+1, and the number of times of operations of the descrambler 209 in the initiator 10 is incremented by one, from Z+0 to Z+1.

The target 20 then transmits one or more packets including frame data and CRC, and the initiator 10 receives the one or more packets (A402, A403). The number of times of operations of the scrambler 204 in the target 20 and the number of times of operations of the descrambler 209 in the initiator 10 are incremented by one, respectively, whenever each packet included in the one or more packets is exchanged. In the example of FIG. 16, when the one or more packets are exchanged, the number of times of operations of the scrambler 204 in the target 20 increments from A+1 to B+0, and the number of times of operations of the descrambler 209 in the initiator 10 increments from Z+1 to Y+1.

After the one or more packets that include frame data and CRC are transmitted, the target 20 transmits a packet that includes EOAF indicating completed transmission of the address frame, and the initiator 10 receives the packet (A404). On the exchange, the number of times of operations of the scrambler 204 in the target 20 increments from B+0 to B+1, and the number of times of operations of the descrambler 209 in the initiator 10 increments from Y+1 to Y+2.

The initiator 10 which receives the packet including EOAF verifies CRC, discards the address frame since a CRC error occurs, and does not respond to the target 20 at all. Consequently, the target 20 detects timeout due to expiry of the timer for the address frame (A405).

After detecting the timeout, the target 20 transmits a packet including PACKET_SYNC and the initiator 10 receives the packet (A406). In response to the transmission of PACKET_SYNC, the number of times of operations of the scrambler 204 in the target 20 increments from B+2 to B+3, and is then initialized to zero. In response to the reception of PACKET_SYNC, the number of times of operations of the descrambler 209 in the initiator 10 increments from Y+3 to Y+4, and is then initialized to zero. Thus, the scrambler 204 in the target 20 is synchronized with the descrambler 209 in the initiator 10 by the initialization on the exchange of PACKET_SYNC.

Then, when an address frame is transmitted again from the target 20 to the initiator 10, the target 20 transmits a packet that includes SOAF indicating the start of the address frame, and the initiator 10 receives the packet (A407). On the exchange, the number of times of operations of the scrambler 204 in the target 20 and the number of times of operations of the descrambler 209 in the initiator 10 are incremented by one, from zero to one, respectively.

The target 20 then transmits one or more packets that include frame data and CRC, and the initiator 10 receives the one or more packets (A408, A409). The number of times of operations of the scrambler 204 in the target 20 and the number of times of operations of the descrambler 209 in the initiator 10 are incremented by one, respectively, whenever each packet included in the one or more packets is exchanged. In the example of FIG. 16, the number of times of operations of the scrambler 204 in the target 20 and the number of times of operations of the descrambler 209 in the initiator 10 increments from 1 to C+0.

After the one or more packets that include frame data and CRC are transmitted, the target 20 transmits a packet that includes EOAF indicating completed transmission of the address frame, and the initiator 10 receives the packet (A410). On the exchange, the number of times of operations of the scrambler 204 in the target 20 and the number of times of operations of the descrambler 209 in the initiator 10 are incremented by one, that is, from C+0 to C+1 respectively.

The initiator 10 which receives the packet including EOAF verifies CRC, and transmits a packet including a primitive for response if a CRC error does not occur, and the target 20 receives the packet. For example, when the transmitted address frame is an OPEN address frame, the primitive for response is OPEN_ACCEPT indicating accepting the connection request or OPEN REJECT indicating rejecting the connection request.

As described above, the target 20 transmits PACKET_SYNC to the initiator 10 when timeout is detected. Thereby, the scrambler 204 in the target 20 and the descrambler 209 in the initiator 10 are initialized and synchronized. Thus, a CRC error does not occur due to a loss of synchronization between the scrambler 204 in the target 20 and the descrambler 209 in the initiator 10 on subsequent exchanges of packets, and the initiator 10 can correctly receive the address frame.

By replacing the explanation of initiator 10 and target 20 with each other, an address frame from the initiator 10 to the target 20 can be correctly transmitted.

Figure 17:
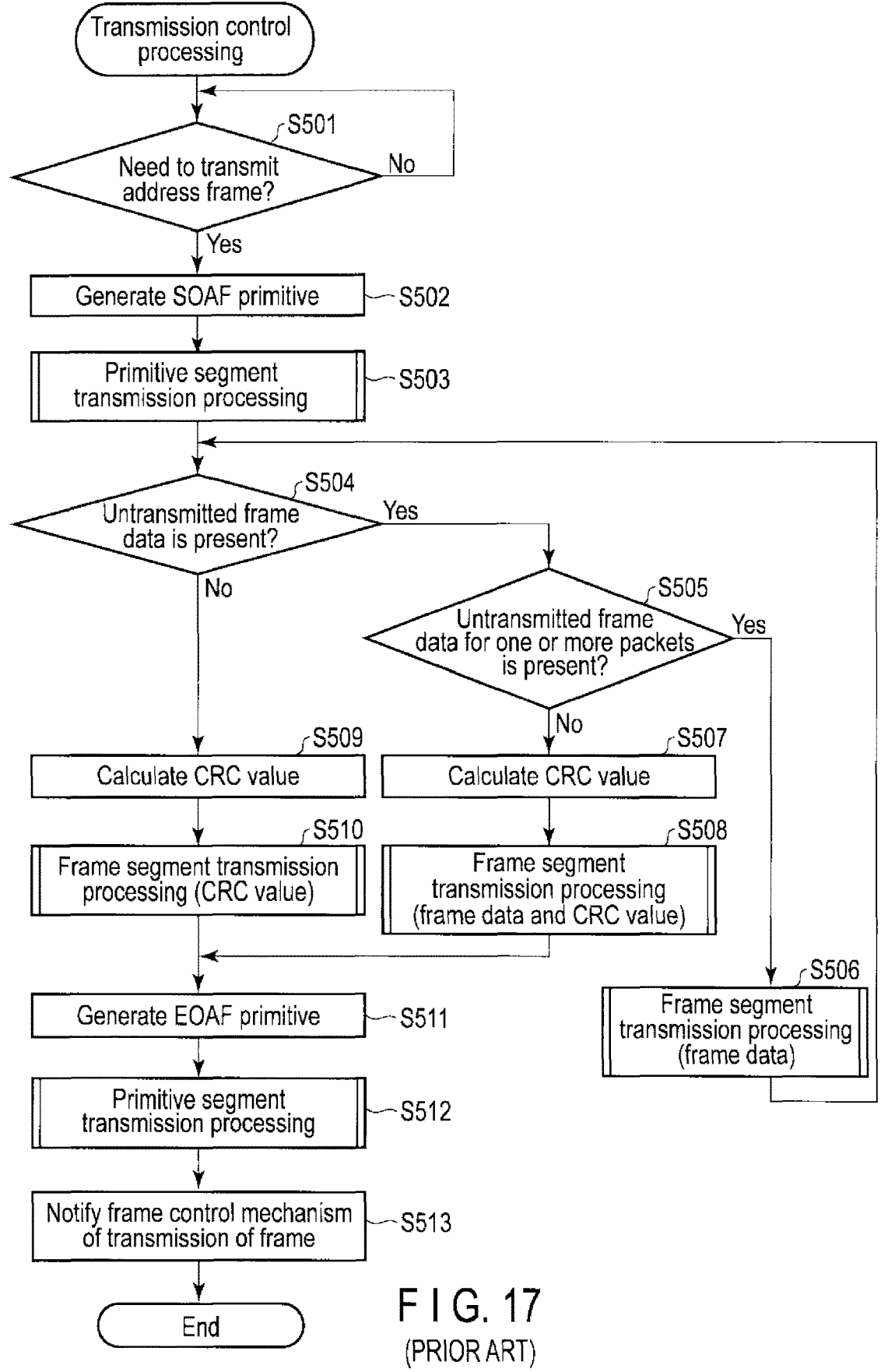
FIG. 17 is a flowchart illustrating an exemplary procedure of a transmission control processing performed by the apparatus of the second embodiment.

The flowchart of FIG. 17 illustrates an exemplary procedure of the transmission control processing performed by the target 20. The target 20 is configured to transmit PACKET_SYNC when transmitting an address frame to the initiator 10 and then detecting timeout.

The target 20 first determines whether it needs to transmit an address frame to the initiator 10 (step S501). When the target 20 does not need to transmit an address frame (NO in step S501), the target 20 returns to step S501 and determines again whether it needs to transmit an address frame to the initiator 10. In this case, the target 20 may transmit a packet including an idle dword segment to the initiator 10, for example.

When the target 20 needs to transmit an address frame (YES in step S501), the target 20 generates SOAF (step S502), and performs the primitive segment transmission processing for transmitting a packet that includes SOAF to the initiator 10 (step S503). The primitive segment transmission processing is as in the flowchart of FIG. 12.

The target 20 then determines whether untransmitted frame data configuring the frame is present (step S504). When untransmitted frame data is present (YES in step S504), the target 20 determines whether untransmitted frame data for one or more packets is present (step S505). When untransmitted frame data for one or more packets is present (YES in step S505), the target 20 performs the frame segment transmission processing for transmitting a packet that includes a frame segment formed of the untransmitted frame data to the initiator 10 (step S506), and returns to step S504. The frame segment transmission processing is as in FIG. 13.

When untransmitted frame data for one or more packets is not present (NO in step S505), the target 20 calculates a CRC value of the frame data configuring the frame (step S507). The target 20 then performs the frame segment transmission processing for transmitting a packet that includes a frame segment formed of the untransmitted frame data and the calculated CRC value to the initiator 10 (step S508).

When untransmitted frame data is not present (NO in step S504), for example, when all the frame data configuring the frame is already transmitted to the initiator 10, the target 20 calculates a CRC value of the frame data configuring the frame (step S509). The target 20 then performs the frame segment transmission processing for transmitting a packet that includes a frame segment formed of the calculated CRC value and, if any, one or more pad dwords to the initiator 10 (step S510).

After all the frame data configuring the frame and the CRC value are transmitted to the initiator 10 in units of a packet (after step S508 or step S510), the target 20 generates EOAF indicating completed transmission of the address frame (step S511), and performs the primitive segment transmission processing for transmitting a packet that includes EOAF to the initiator 10 (step S512). The target 20 (more specifically the frame transmission controller 206) then notifies the frame control mechanism 215 in the controller 201 of transmission of the address frame (step S513).

The flowchart of FIG. 18 illustrates an exemplary procedure of the response control processing performed by the target 20.

At first, the target 20 determines whether it has received a response from the initiator 10 (step S521). When the target 20 has received a response (YES in step S513), the target 20 (the primitive decoder 211) notifies the frame control mechanism 215 in the controller 201 of reception of the response (step S522). The operations of the frame control mechanism 215 is as in the flowchart of FIG. 14. FIG. 14 illustrates that a response such as ACK or NAK is received for transmission of an SSP frame, but the response is replaced with a response such as OPEN_ACCEPT or OPEN_REJECT for transmission of an OPEN address frame, and the response is replaced with reception of an IDENTIFY address frame for transmission of an IDENTIFY address frame, thereby similarly realizing the operations of the frame control mechanism 215. The target 20 performs an operation for the contents of the response (step S523), and terminates the processing.

On the other hand, when the target 20 has not received a response (NO in step S521), the target 20 determines whether timeout is detected due to expiry of the timer for the address frame (step S524). When the timeout is not detected (NO in step S524), the processing returns to step S521.

On the other hand, when the timeout is detected (YES in step S524), the target 20 generates PACKET_SYNC (step S525), and performs the primitive segment transmission processing for transmitting a packet that includes PACKET_SYNC to the initiator 10 (step S526). The target 20 then initializes the scrambler 204 (step S527), and terminates the processing. The number of times of operations of the scrambler 204 is initialized to zero by the initialization.

Figure 19:
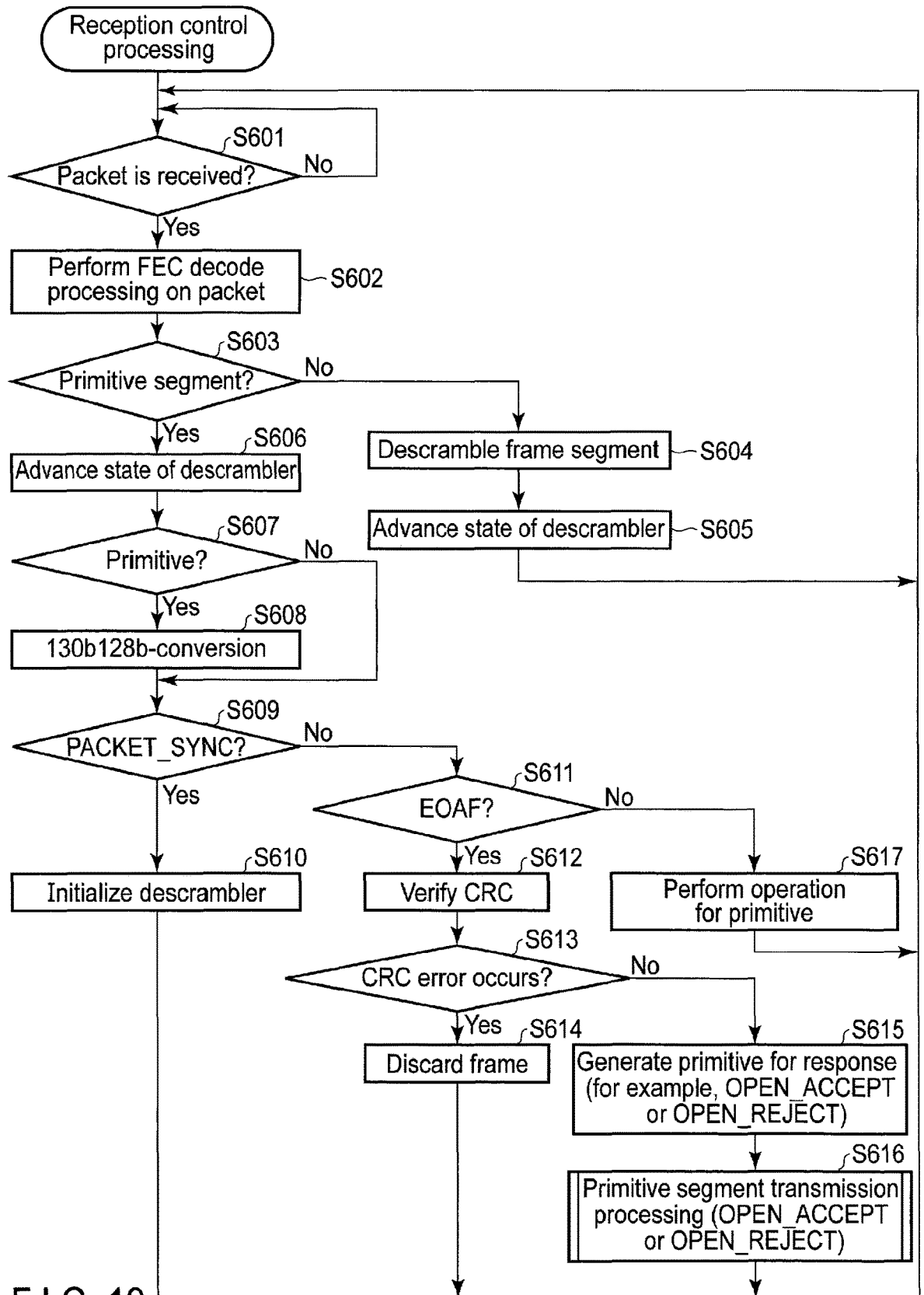
FIG. 19 is a flowchart illustrating an exemplary procedure of a reception control processing performed by the apparatus of the second embodiment.

FIG. 19 illustrates an exemplary procedure of the reception control processing performed by the initiator 10.

The procedure of step S601 to step S608 is similar to the procedure of step S401 to step S408 in the flowchart of FIG. 15.

After the procedure of step S601 to step S608, the initiator 10 determines whether PACKET_SYNC is included in the primitive segment (step S609). When PACKET_SYNC is included in the primitive segment (YES in step S609), the initiator 10 initializes the descrambler 209 (step S610), and returns to step S601. The number of times of operations of the descrambler 209 is initialized to zero by the initialization.

When PACKET_SYNC is not included in the primitive segment (NO in step S609), the initiator 10 determines whether EOAF indicating completed transmission of the address frame is included in the primitive segment (S611). When EOAF is included in the primitive segment (YES in step S611), the initiator 10 verifies the CRC value of the frame (step S612), and determines whether a CRC error occurs in the frame (step S613).

When a CRC error occurs (YES in step S613), the initiator 10 discards the frame (step S614), does not respond to the target 20 at all, and returns to step S601.

When a CRC error does not occur (NO in step S613), the initiator 10 generates a primitive for response (step S615). For example, if the address frame is an OPEN address frame for a connection request, the primitive for response is an OPEN_ACCEPT primitive for accepting the connection request or an OPEN_REJECT primitive for rejecting the connection request. The initiator 10 performs the primitive segment transmission processing for transmitting a packet that includes the primitive for response to the target 20 (step S616), and returns to step S601.

When EOAF is not included in the primitive segment (NO in step S611), the initiator 10 performs an operation for the primitive included in the primitive segment (step S617), and returns to step S601.

As described above, it is possible to prevent an error and timeout from occurring in a subsequent frame.

(Third Embodiment)

The initiator 10 and the target 20 transmit PACKET_SYNC in response to reception of a primitive indicating a CRC error according to the first embodiment. Further, the initiator 10 and the target 20 transmit PACKET_SYNC in response to detection of timeout according to the second embodiment. Furthermore, an initiator 10 and a target 20 transmit PACKET_SYNC to prevent a CRC error from occurring according to a third embodiment.

As described in FIG. 2, in the SAS Gen4 apparatus (initiator/target), the number of times of operations of the scrambler 106 does not increment on transmission of a primitive and the number of times of operations of the descrambler 109 does not increment on reception of a primitive (i.e., the states do not advance). On the other hand, in the SAS Gen5 apparatus (initiator 10/target 20), the number of times of operations of the scrambler 204 increments on transmission of a primitive and the number of times of operations of the descrambler 209 increments on reception of a primitive (i.e., the states advance).

However, the SAS Gen5 apparatuses may include an apparatus which is mistakenly configured such that the number of times of operations of the scrambler 204/descrambler 209 does not increase on exchange of a primitive, like the SAS Gen4 apparatus. Thus, the apparatus is configured to transmit PACKET_SYNC after transmitting a primitive, a binary primitive, or an extended binary primitive other than PACKET_SYNC, thereby accurately synchronizing the scrambler 204 and the descrambler 209.

A configuration of an information processing system 1 according to the third embodiment is similar to the configuration of the information processing system 1 according to the first and second embodiments, and the third embodiment is different from the first and second embodiments only in the procedures of the processing performed by a controller 201. Only the differences from the first and second embodiments will be described below.

The controller 201 is configured to transmit PACKET_SYNC to another initiator/target 10, 20 after transmitting any of a primitive, a binary primitive, or an extended binary primitive except for a primitive for initializing the scrambler to another initiator/target 10, 20.

Figure 20:
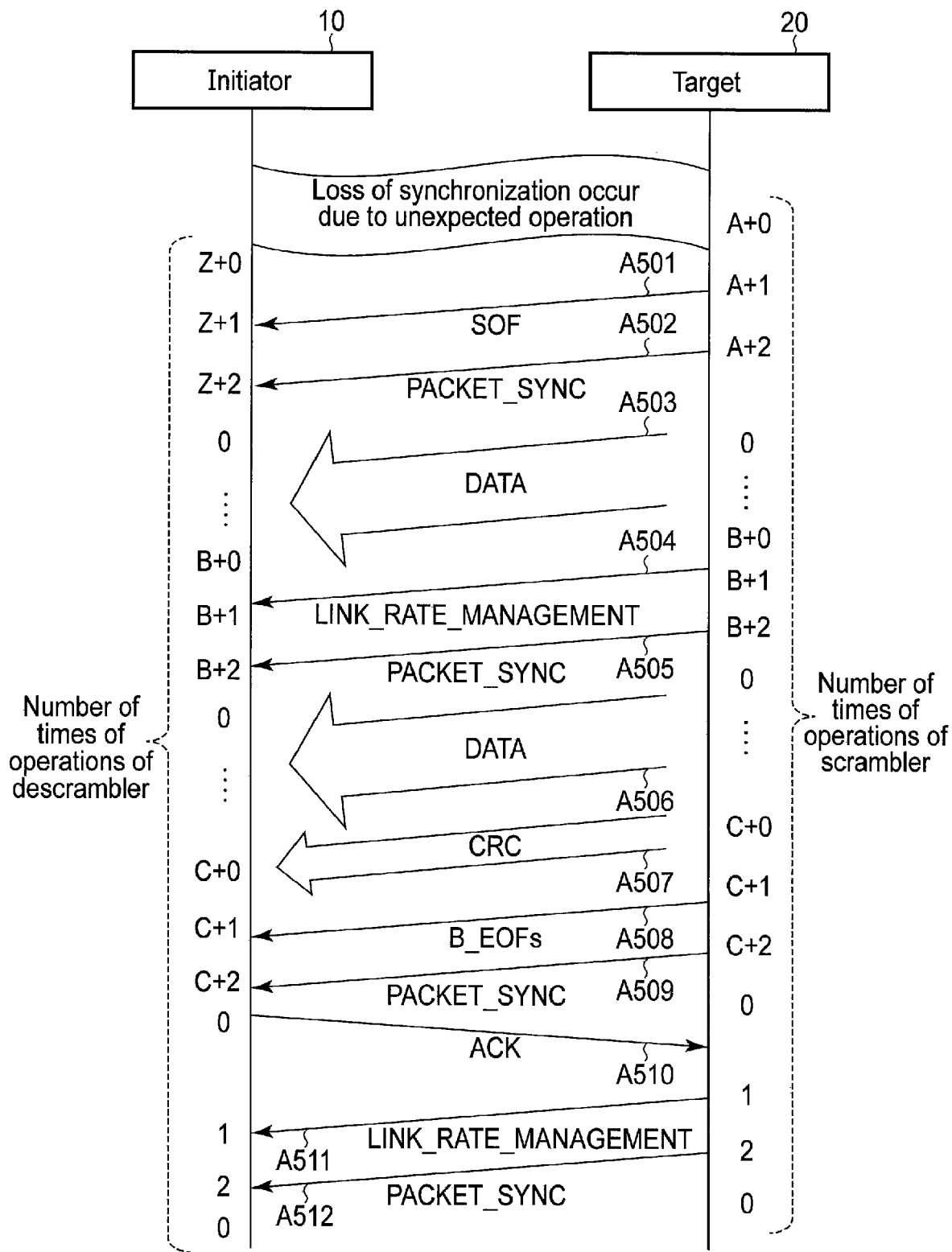
FIG. 20 is an exemplary diagram illustrating that PACKET_SYNC is transmitted after a primitive is transmitted in an information processing system including an apparatus according to a third embodiment.

FIG. 20 illustrates that the initiator 10 and the target 20 transmit PACKET_SYNC after transmitting a primitive, a binary primitive, or an extended binary primitive other than PACKET_SYNC by way of example. Transmission of an SSP frame will be described below by way of example, but the description is applicable to transmission of other frames such as an SMP frame, an STP frame, and an address frame.

It is assumed herein that before an SSP frame is transmitted, a loss of synchronization between a scrambler 204 in the target 20 and a descrambler 209 in the initiator 10 occurs due to an unexpected operation. As illustrated in FIG. 20, before an SSP frame starts being transmitted, the number of times of operations of the scrambler 204 in the target 20 is A+0, and the number of times of operations of the descrambler 209 in the initiator 10 is Z+0, which is different from A+0.

When an SSP frame is transmitted from the target 20 to the initiator 10, the target 20 first transmits a packet that includes SOF indicating the start of the SSP frame, and the initiator 10 receives the packet (A501). On the exchange, the number of times of operations of the scrambler 204 in the target 20 is incremented by one, from A+0 to A+1, and the number of times of operations of the descrambler 209 in the initiator 10 is incremented by one, from Z+0 to Z+1.

Since SOF as a primitive other than PACKET_SYNC is transmitted, the target 20 then transmits a packet including PACKET_SYNC, and the initiator 10 receives the packet (A502). On the transmission of PACKET_SYNC, the number of times of operations of the scrambler 204 in the target 20 increments from A+1 to A+2, and is then initialized to zero. On the reception of PACKET_SYNC, the number of times of operations of the descrambler 209 in the initiator 10 increments from Z+1 to Z+2, and is then initialized to zero. Thus, the scrambler 204 in the target 20 is synchronized with the descrambler 209 in the initiator 10 by the initialization on the exchange of PACKET_SYNC, The target 20 then transmits one or more packets that include frame data, and the initiator 10 receives the one or more packets (A503). Whenever each packet included in the one or more packets is exchanged, the number of times of operations of the scrambler 204 in the target 20 and the number of times of operations of the descrambler 209 in the initiator 10 are incremented by one, respectively. In the example of FIG. 20, on the exchange of the one or more packets, the number of times of operations of the scrambler 204 in the target 20 and the number of times of operations of the descrambler 209 in the initiator 10 increment from 0 to B+0.

After the one or more packets that include frame data are transmitted, the target 20 transmits a packet that includes a primitive (LINK_RATE_MANAGEMENT extended binary primitive here) while transmitting the SSP frame (A504). A primitive, a binary primitive, and an extended binary primitive can be transmitted also within a frame in SAS Gen5. On the exchange, the number of times of operations of the scrambler 204 in the target 20 and the number of times of operations of the descrambler 209 in the initiator 10 increment from B+0 to B+1.

Since LINK_RATE_MANAGEMENT, which is an extended binary primitive other than PACKET_SYNC, is transmitted, the target 20 then transmits a packet that includes PACKET_SYNC and the initiator 10 receives the packet (A505). On the transmission of PACKET_SYNC, the number of times of operations of the scrambler 204 in the target 20 increments from B+1 to B+2, and is then initialized to zero. Further, on the reception of PACKET_SYNC, the number of times of operations of the descrambler 209 in the initiator 10 increments from B+1 to B+2, and is then initialized to zero. Thus, the scrambler 204 in the target 20 is synchronized with the descrambler 209 in the initiator 10 by the initialization on the exchange of PACKET_SYNC, The target 20 then transmits one or more packets that include frame data and CRC, and the initiator 10 receives the one or more packets (A506, A507). Whenever each packet included in the one or more packets is exchanged, the number of times of operations of the scrambler 204 in the target 20 and the number of times of operations of the descrambler 209 in the initiator 10 are incremented by one to be C+0.

After the one or more packets including frame data and CRC are transmitted, the target 20 transmits a packet that includes B_EOFs indicating completed transmission of the SSP frame, and the initiator 10 receives the packet (A508). On the exchange, the number of times of operations of the scrambler 204 in the target 20 and the number of times of operations of the descrambler 209 in the initiator 10 increment from C+0 to C+1.

Since B_EOFs, which is a primitive other than PACKET_SYNC, is transmitted, the target 20 transmits a packet that includes PACKET_SYNC and the initiator 10 receives the packet (A509). On the exchange of PACKET_SYNC, the number of times of operations of the scrambler 204 in the target 20 and the number of times of operations of the descrambler 209 in the initiator 10 increment from C+1 to C+2, and are then initialized to zero.

The initiator 10 which receives the packet including B_EOFs verifies CRC, and transmits a packet including ACK since a CRC error does not occur, and the target 20 receives the packet (A510).

Further, the target 20 transmits a packet that includes a primitive (LINK_RATE_MANAGEMENT extended binary primitive here) after transmitting the SSP frame (A511). On the exchange, the number of times of operations of the scrambler 204 in the target 20 and the number of times of operations of the descrambler 209 in the initiator 10 increment from zero to one.

Since LINK_RATE_MANAGEMENT, which is an extended binary primitive other than PACKET_SYNC, is transmitted, the target 20 then transmits a packet that includes PACKET_SYNC and the initiator 10 receives the packet (A512). On the transmission of PACKET_SYNC, the number of times of operations of the scrambler 204 in the target 20 increments from one to two, and is then initialized to zero. Further, on the reception of PACKET_SYNC, the number of times of operations of the descrambler 209 in the initiator 10 increments from one to two, and is then initialized to zero. Thus, the scrambler 204 in the target 20 is synchronized with the descrambler 209 in the initiator 10 by the initialization on the exchange of PACKET_SYNC.

As described above, the target 20 transmits any of a primitive, a binary primitive, and an extended binary primitive other than PACKET_SYNC, such as SOF, B_EOFs, and LINK_RATE_MANAGEMENT, to the initiator 10, and then transmits PACKET_SYNC, Thereby, the scrambler 204 in the target 20 and the descrambler 209 in the initiator 10 are initialized and synchronized. Thus, on subsequent exchange of packets, a CRC error due to a loss of synchronization between the scrambler 204 in the target 20 and the descrambler 209 in the initiator 10 does not occur, and the initiator 10 can correctly receive the SSP frame.

Figure 21:
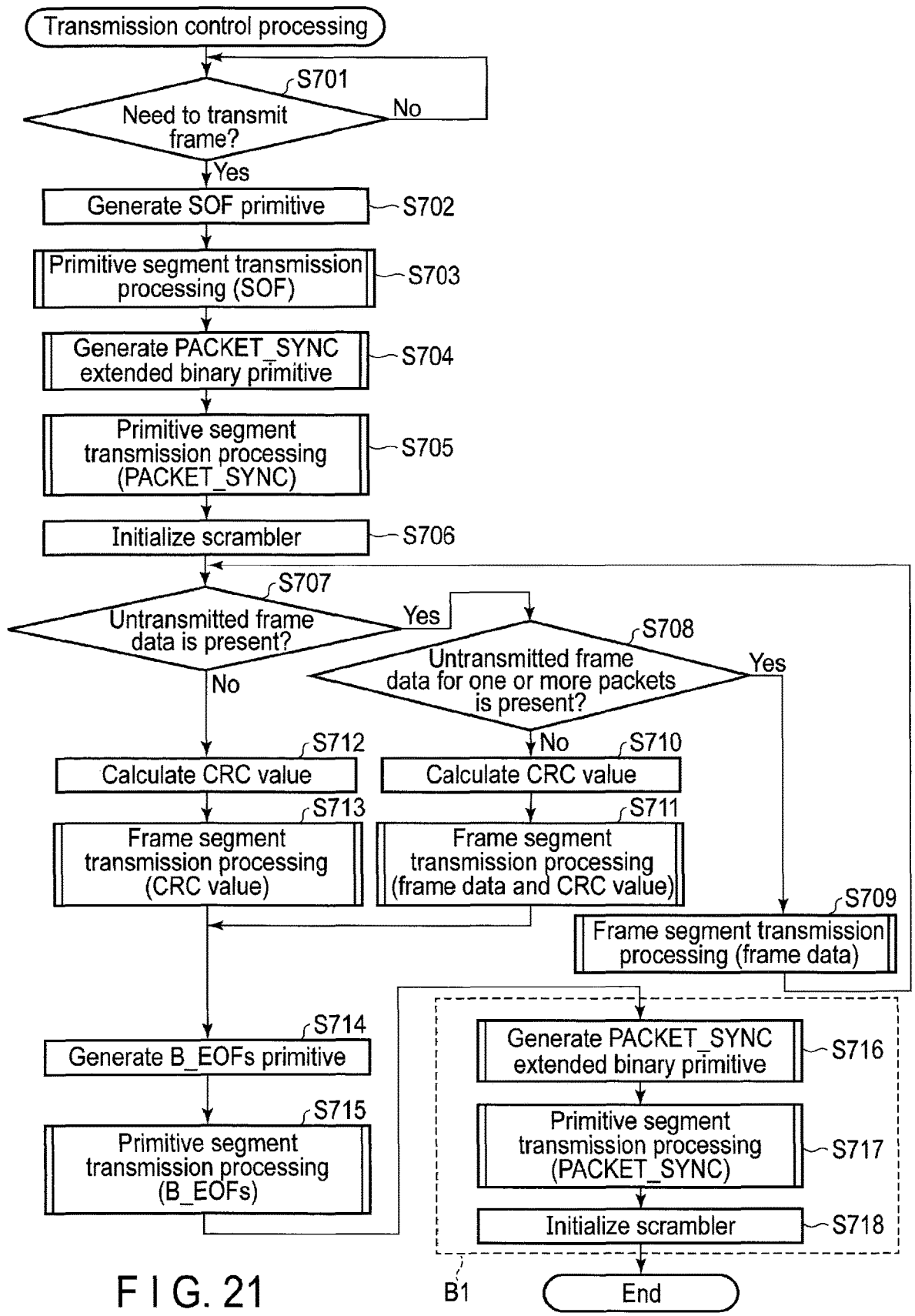
FIG. 21 is a flowchart illustrating an exemplary procedure of a transmission control processing performed by the apparatus of the third embodiment.

The flowchart of FIG. 21 illustrates an exemplary procedure of the transmission control processing performed by the target 20. The target 20 is configured to transmit PACKET_SYNC after transmitting any of a primitive, a binary primitive, and an extended binary primitive other than PACKET_SYNC to the initiator 10.

At first, the target 20 determines whether it needs to transmit a frame to the initiator 10 (step S701). When the target 20 does not need to transmit a frame (NO in step S701), the processing returns to step S701, where a determination is made again as to whether the target 20 needs to transmit a frame to the initiator 10. In this case, the target 20 may transmit a packet that includes an idle dword segment to the initiator 10, for example.

When the target 20 needs to transmit a frame (YES in step S701), the target 20 generates SOF (step S702), and performs the primitive segment transmission processing for transmitting a packet that includes SOF to the initiator 10 (step S703). The primitive segment transmission processing is as in the flowchart of FIG. 12.

Further, the target 20 generates PACKET_SYNC (step S704), and performs the primitive segment transmission processing for transmitting a packet that includes PACKET_SYNC to the initiator 10 (step S705). The target 20 then initializes the scrambler 204 (step S706). The number of times of operations of the scrambler 204 is initialized to zero by the initialization.

The target 20 then determines whether untransmitted frame data configuring the frame is present (step S707). When untransmitted frame data is present (YES in step S707), the target 20 determines whether untransmitted frame data for one or more packets is present (step S708). When untransmitted frame data for one or more packets is present (YES in step S708), the target 20 performs the frame segment transmission processing for transmitting a packet that includes a frame segment formed of the untransmitted frame data to the initiator 10 (step S709), and returns to step S707. The frame segment transmission processing is as in FIG. 13.

When untransmitted frame data for one or more packets is not present (NO in step S708), the target 20 calculates a CRC value of the frame data configuring the frame (step S710). The target 20 then performs the frame segment transmission processing for transmitting a packet that includes a frame segment formed of the untransmitted frame data and the calculated CRC value to the initiator 10 (step S711).

Further, when untransmitted frame data is not present (NO in step S707), for example, when all the frame data configuring the frame is already transmitted to the initiator 10, the target 20 calculates a CRC value of the frame data configuring the frame (step S712). The target 20 then performs the frame segment transmission processing for transmitting a packet that includes a frame segment formed of the calculated CRC value and, if any, one or more pad dwords to the initiator 10 (step S713).

After all the frame data configuring the frame and the CRC value are transmitted to the initiator 10 in units of a packet (after step S711 or step S713), the target 20 generates B_EOFs indicating completed transmission of the frame (step S714), and performs the primitive segment transmission processing for transmitting a packet that includes B_EOFs to the initiator 10 (step S715).

Further, the target 20 generates PACKET_SYNC (step S716), and performs the primitive segment transmission processing for transmitting a packet that includes PACKET_SYNC to the initiator 10 (step 3717). The target 20 then initializes the scrambler 204 (step S718). The number of times of operations of the scrambler 204 is initialized to zero by the initialization.

In SAS Gen5, a primitive, a binary primitive, and an extended binary primitive can be transmitted within a frame. In this case, the procedure of step S709 in FIG. 21 can be replaced with the procedure in the flowchart of FIG. 22, for example.

As illustrated in FIG. 22, the target 20 determines whether it needs to transmit a primitive, a binary primitive, or an extended binary primitive while transmitting a frame (when untransmitted frame data for one or more packets is present in step S708 here) (step S721). When the target 20 does not need to transmit a primitive, a binary primitive, or an extended binary primitive (NO in step S721), the target 20 performs the frame segment transmission processing for transmitting a packet that includes a frame segment formed of the untransmitted frame data to the initiator 10 (step S727). The frame segment transmission processing is as in FIG. 13.

On the other hand, when the target 20 needs to transmit a primitive, a binary primitive, or an extended binary primitive (YES in step S721), the target 20 generates a requested primitive (such as LINK_RATE_MANAGEMENT) (step S722), and performs the primitive segment transmission processing for transmitting a packet that includes the generated primitive to the initiator 10 (step S725). The primitive segment transmission processing is as in FIG. 12.

Further, the target 20 generates PACKET_SYNC (step S724), and performs the primitive segment transmission processing for transmitting a packet that includes PACKET_SYNC to the initiator 10 (step S725). The target 20 then initializes the scrambler 204 (step S726). The number of times of operations of the scrambler 204 is initialized to zero by the initialization.

The target 20 then performs the frame segment transmission processing for transmitting a packet that includes a frame segment formed of the untransmitted frame data to the initiator 10 (step S727).

The reception control processing is as in the flowchart of FIG. 15.

(Fourth Embodiment)

There will be described another example in which an initiator 10 and a target 20 transmit PACKET_SYNC to prevent a CRC error from occurring according to a fourth embodiment.

A configuration of an information processing system 1 according to the fourth embodiment is similar to the configuration of the information processing system 1 according to the first to third embodiments, and the fourth embodiment is different from the first to third embodiments only in the procedures of the processing performed by a controller 201. Only the differences from the first to third embodiments will be described below.

It takes one millisecond to detect timeout according to the second embodiment, for example. When the address frame is an IDENTIFY address frame, the timeout causes a Phy reset sequence, and the link reset sequence needs to be performed again. It takes 500 milliseconds to perform the link reset sequence again, for example. Therefore, an occurrence of timeout requires a long time to perform the subsequent recovery processing.

If there is configured such that a primitive, a binary primitive, or an extended binary primitive other than PACKET_SYNC is subsequently transmitted and then PACKET_SYNC is transmitted, overhead due to the transmission of PACKET_SYNC increases. For example, the amount of exchange increases by 150 bits corresponding to a packet including PACKET_SYNC, for example.

Thus, as illustrated in FIG. 23, the controller 201 provided in the initiator 10 and the target 20 may be configured to transmit PACKET_SYNC only after transmitting a primitive indicating the start of transmission of a frame whose CRC is to be verified (such as SOF or SOAF). Thereby, it is possible to prevent a CRC error from occurring while restricting increase in the amount of exchange (i.e., overhead).

It is assumed herein that before an SSP frame is transmitted, a loss of synchronization between a scrambler 204 in the target 20 and a descrambler 209 in the initiator 10 occurs due to an unexpected operation. As illustrated in FIG. 23, before an SSP frame starts being transmitted, the number of times of operations of the scrambler 204 in the target 20 is A+0, and the number of times of operations of the descrambler 209 in the initiator 10 is Z+0, which is different from A+0.

When an SSP frame is transmitted from the target 20 to the initiator 10, the target 20 first transmits a packet that includes SOF indicating the start of the SSP frame, and the initiator 10 receives the packet (A61). On the exchange, the number of times of operations of the scrambler 204 in the target 20 is incremented by one, from A+0 to A+1, and the number of times of operations of the descrambler 209 in the initiator 10 is incremented by one, from Z+0 to Z+1.

SOF is transmitted, and thus the target 20 then transmits a packet that includes PACKET_SYNC and the initiator 10 receives the packet (A62). On the transmission of PACKET_SYNC, the number of times of operations of the scrambler 204 in the target 20 increments from A+1 to A+2, and is then initialized to zero. On the reception of PACKET_SYNC, the number of times of operations of the descrambler 209 in the initiator 10 increments from Z+1 to Z+2, and is then initialized to zero. Thus, the scrambler 204 in the target 20 is synchronized with the descrambler 209 in the initiator 10 by the initialization on the exchange of PACKET_SYNC.

The target 20 then transmits one or more packets that include frame data, and the initiator 10 receives the one or more packets (A63). Whenever each packet included in the one or more packets is exchanged, the number of times of operations of the scrambler 204 in the target 20 and the number of times of operations of the descrambler 209 in the initiator 10 are incremented by one, which is to be B+0.

After the one or more packets including frame data are transmitted, the target 20 transmits a packet that includes a primitive (LINK_RATE_MANAGEMENT extended binary primitive here) within the SSP frame (A64). In SAS Gen5, it is possible to transmit a primitive, a binary primitive, and an extended binary primitive also within a frame. On the exchange, the number of times of operations of the scrambler 204 in the target 20 and the number of times of operations of the descrambler 209 in the initiator 10 increment from B+0 to B+1.

The target 20 then transmits one or more packets that include frame data and CRC, and the initiator 10 receives the one or more packets (A65, A66). Whenever each packet included in the one or more packets is exchanged, the number of times of operations of the scrambler 204 in the target 20 and the number of times of operations of the descrambler 209 in the initiator 10 are incremented by one, to be C+0.

After the one or more packets that include frame data and CRC are transmitted, the target 20 transmits a packet that includes B_EOFs indicating completed transmission of the SSP frame, and the initiator 10 receives the packet (A67). On the exchange, the number of times of operations of the scrambler 204 in the target 20 and the number of times of operations of the descrambler 209 in the initiator 10 increment from C+0 to C+1.

The initiator 10 which receives the packet that includes B_EOFs then verifies CRC, and transmits a packet including ACK since a CRC error does not occur, and the target 20 receives the packet (A68).

As described above, the target 20 transmits a primitive indicating the start of transmission of a frame such as SOF or SOAF to the initiator 10, and then transmits PACKET_SYNC, Thereby, the scrambler 204 in the target 20 and the descrambler 209 in the initiator 10 are initialized and synchronized. Thus, on subsequent exchanges of packets, a CRC error due to a loss of synchronization between the scrambler 204 in the target 20 and the descrambler 209 in the initiator 10 does not occur, and the initiator 10 can correctly receive the SSP frame. PACKET_SYNC is transmitted only after a primitive indicating the start of transmission of a frame is transmitted, thereby reducing overhead due to transmission of PACKET_SYNC, By replacing the explanation of initiator 10 and target 20 with each other, an SSP frame from the initiator 10 to the target 20 can be correctly transmitted.

The frame transmission control processing in the above operations is realized by excluding the procedure of S716 to S718 included in the broken frame B1 from the procedure in the flowchart of FIG. 21. When the procedure of S709 in FIG. 21 is replaced with the procedure in the flowchart of FIG. 22, the frame transmission control processing in the above operations is realized by further excluding the procedure of S722 to S726. The reception control processing is as in the flowchart of FIG. 15.

(Fifth Embodiment)

There will be described still another example in which an initiator 10 and a target 20 transmit PACKET_SYNC to prevent a CRC error from occurring according to a fifth embodiment.

A configuration of an information processing system 1 according to the fifth embodiment is similar to the configuration of the information processing system 1 according to the first to fourth embodiments, and the fifth embodiment is different from the first to fourth embodiments only in the procedures of the processing performed by a controller 201. Only the differences from the first to fourth embodiments will be described below.

As described above, the SAS Gen5 apparatuses may include an apparatus which is mistakenly configured not to increment the number of times of operations of a scrambler 204/descrambler 209 on exchange of a primitive, like the SAS Gen4 apparatus. In this case, as illustrated in FIG. 24, even if PACKET_SYNC is transmitted after a primitive (SOF) indicating the start of transmission of a frame is transmitted, the number of times of operations of the scrambler 204 in the initiator 10 may be different from the number of times of operations of the descrambler 209 in the target 20 due to transmission of a primitive within the frame.

In the example of FIG. 24, it is assumed that before an SSP frame is transmitted, a loss of synchronization between the scrambler 204 in the target 20 and the descrambler 209 in the initiator 10 occurs due to an unexpected operation. As illustrated in FIG. 24, before the SSP frame starts being transmitted, the number of times of operations of the scrambler 204 in the target 20 is A+0, and the number of times of operations of the descrambler 209 in the initiator 10 is Z+0, which is different from A+0.

When an SSP frame is transmitted from the target 20 to the initiator 10, the target 20 first transmits a packet that includes SOF indicating the start of the SSP frame, and the initiator 10 receives the packet (A71). On the exchange, the number of times of operations of the scrambler 204 in the target 20 is incremented by one, from A+0 to A+1, but the number of times of operations of the descrambler 209 in the initiator 10 does not increment and remains at Z+0.

SOF is transmitted, and thus the target 20 then transmits a packet including PACKET_SYNC, and the initiator 10 receives the packet (A72). The target 20 is configured to transmit PACKET_SYNC only after transmitting a primitive indicating the start of transmission of a frame whose CRC is to be verified (such as SOF or SOAF) similarly to the target 20 according to the fourth embodiment. On the transmission of PACKET_SYNC, the number of times of operations of the scrambler 204 in the target 20 increments from A+1 to A+2, and is then initialized to zero. On the reception of PACKET_SYNC, the number of times of operations of the descrambler 209 in the initiator 10 is initialized to zero. Thus, the scrambler 204 in the target 20 is synchronized with the descrambler 209 in the initiator 10 by the initialization on exchange of PACKET_SYNC, The target 20 then transmits one or more packets that include frame data, and the initiator 10 receives the one or more packets (A73). Whenever each packet included in the one or more packets is exchanged, the number of times of operations of the scrambler 204 in the target 20 and the number of times of operations of the descrambler 209 in the initiator 10 are incremented by one, to be B+0.

After the one or more packets that include frame data are transmitted, the target 20 transmits a packet including a primitive (such as a LINK_RATE_MANAGEMENT extended binary primitive here) within the SSP frame (A74). In SAS Gen5, it is possible to transmit a primitive, a binary primitive, and an extended binary primitive also within a frame. On the exchange, the number of times of operations of the scrambler 204 in the target 20 is incremented by one, that is, from B+0 to B+1, but the number of times of operations of the descrambler 209 in the initiator 10 does not increase and remains at B+0. Consequently, a loss of synchronization between the scrambler 204 in the target 20 and the descrambler 209 in the initiator 10 occurs.

The target 20 then transmits one or more packets that include frame data and CRC, and the initiator 10 receives the one or more packets (A75, A76). Whenever each packet included in the one or more packets is exchanged, the number of times of operations of the scrambler 204 in the target 20 and the number of times of operations of the descrambler 209 in the initiator 10 are incremented by one, respectively. In the example of FIG. 24, on the exchange of the one or more packets, the number of times of operations of the scrambler 204 in the target 20 increments from B+1 to C+1, and the number of times of operations of the descrambler 209 in the initiator 10 increments from B+0 to C+0.

After the one or more packets that include frame data and CRC are transmitted, the target 20 transmits a packet including B_EOFs indicating completed transmission of the frame, and the initiator 10 receives the packet (A77). On the exchange, the number of times of operations of the scrambler 204 in the target 20 increments from C+1 to C+2, but the number of times of operations of the descrambler 209 in the initiator 10 remains at C+0.

The initiator 10 which receives the packet including B_EOFs verifies CRC, discards the SSP frame since a CRC error occurs, and transmits a packet including NAK (CRC ERROR), and the target 20 receives the packet (A78).

On the exchange of the packets, after the packet including LINK_RATE_MANAGEMENT is exchanged, the number of times of operations of the scrambler 204 in the target 20 does not match with the number of times of operations of the descrambler 209 in the initiator 10, and thus the scrambler 204 in the target 20 is not synchronized with the descrambler 209 in the initiator 10. Thus, a CRC error occurs due to a loss of synchronization between the scrambler 204 in the target 20 and the descrambler 209 in the initiator 10, and the initiator 10 cannot correctly receive the SSP frame.

Figure 25:
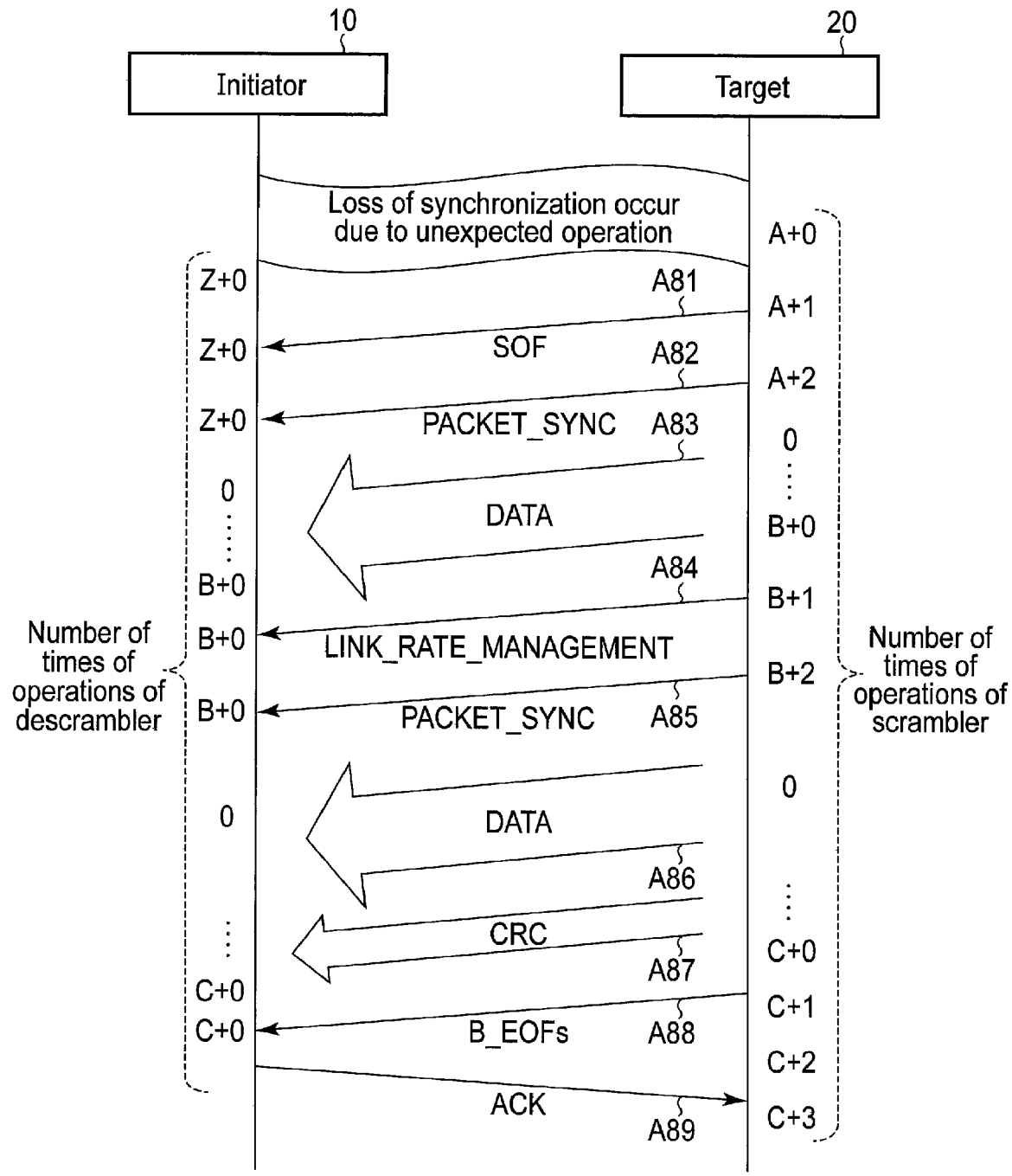
FIG. 25 is an exemplary diagram illustrating that PACKET_SYNC is transmitted after a primitive indicating the start of a frame transmission is transmitted and after a primitive within a frame is transmitted in an information processing system including an apparatus according to a fifth embodiment.

Therefore, as illustrated in FIG. 25, the controllers 201 provided in the initiator 10 and the target 20 may be configured to transmit PACKET_SYNC after transmitting a primitive indicating the start of transmission of a frame (such as SOF or SOAF), and to transmit PACKET_SYNC after a primitive, a binary primitive, or an extended binary primitive other than PACKET_SYNC is transmitted between a primitive indicating the start of transmission of a frame and a primitive indicating completed transmission of the frame (such as B_EOFs or EOAF).

In the example of FIG. 25, exchanging packets in A81 to A83 is similar to exchanging packets in A71 to A73 illustrated in FIG. 24. Similarly as in A74 in FIG. 24, the target 20 transmits a packet including LINK_RATE_MANAGEMENT within the SSP frame, and the initiator 10 receives the packet (A84).

Since LINK_RATE_MANAGEMENT, which is an extended binary primitive other than PACKET_SYNC, is transmitted after SOF indicating the start of transmission of a frame is transmitted and until B_EOFs indicating completed transmission of the frame is transmitted, the target 20 transmits a packet including PACKET_SYNC, and the initiator 10 receives the packet (A85). On the transmission of PACKET_SYNC, the number of times of operations of the scrambler 204 in the target 20 increments from B+1 to B+2, and is then initialized to zero. On the reception of PACKET_SYNC, the number of times of operations of the descrambler 209 in the initiator 10 is initialized to zero. Thereby, the scrambler 204 in the target 20 can be synchronized with the descrambler 209 in the initiator 10.

The target 20 then transmits one or more packets that include frame data and CRC, and the initiator 10 receives the one or more packets (A86, A87). Whenever each packet included in the one or more packets is exchanged, the number of times of operations of the scrambler 204 in the target 20 and the number of times of operations of the descrambler 209 in the initiator 10 are incremented by one, respectively. In the example of FIG. 25 on the exchange of the one or more packets, the number of times of operations of the scrambler 204 in the target 20 and the number of times of operations of the descrambler 209 in the initiator 10 increments from 0 to C+0.

After the one or more packets that include frame data and CRC are transmitted, the target 20 transmits a packet that includes B_EOFs indicating completed transmission of the SSP frame, and the initiator 10 receives the packet (A88). On the exchange, the number of times of operations of the scrambler 204 in the target 20 increments from C+0 to C+1, but the number of times of operations of the descrambler 209 in the initiator 10 remains at C+0.

The initiator 10 which receives the packet including B_EOFs then verifies CRC, and transmits a packet including ACK since a CRC error does not occur, and the target 20 receives the packet (A89).

As described above, the target 20 transmits PACKET_SYNC to the initiator 10 after a primitive indicating the start of transmission of a frame is transmitted, and further transmits PACKET_SYNC after a primitive, a binary primitive, or an extended binary primitive other than PACKET_SYNC is transmitted between a primitive indicating the start of transmission of a frame and a primitive indicating completed transmission of the frame. Thereby, the scrambler 204 in the target 20 and the descrambler 209 in the initiator 10 are initialized and synchronized. Thus, on subsequent exchanges of packets, a CRC error does not occur due to a loss of synchronization between the scrambler 204 in the target 20 and the descrambler 209 in the initiator 10, and the initiator 10 can correctly receive the SSP frame.

Even if the SAS Gen5 apparatuses include an apparatus which is mistakenly configured not to increment the number of times of operations of the scrambler 204/descrambler 209 on exchange of a primitive, like the SAS Gen4 apparatus, the scrambler 204 can be accurately synchronized with the descrambler 209 with the above configuration.

By replacing the explanation of initiator 10 and target 20 with each other, the target 20 can correctly receive an SSP frame.

The frame transmission control processing in the above operations is realized by replacing the procedure of step S709 in FIG. 21 with the procedure in the flowchart of FIG. 22 and excluding the procedure of S716 to S718 included in the broken frame B1, for example. The reception control processing is as in the flowchart of FIG. 15.

As described above, a frame can be correctly transmitted according to the first to fifth embodiments. An error due to a loss of synchronization between the scrambler and the descrambler can be prevented from occurring in a frame to be transmitted. The initiator/target 10, 20 is capable of exchanging a frame with an external apparatus (another initiator/target 10, 20) in the SAS packet mode. The controller 201 is configured to transmit a frame to an external apparatus and to transmit PACKET_SYNC to the external apparatus when the frame is not correctly received by the external apparatus, for example, when a response for the frame is received from the external apparatus and the response includes NAK (CRC ERROR) indicating a CRC error. Thereby, it is possible to prevent an error from occurring in a subsequent frame.

The controller 201 may be configured to transmit an address frame to an external apparatus and to transmit PACKET_SYNC to the external apparatus when timeout for the address frame is detected. Thereby, it is possible to prevent an error and timeout from occurring in a subsequent frame.

The controller 201 may transmit PACKET_SYNC to an external apparatus at the following timings:

(1) After transmitting a primitive, a binary primitive, or an extended binary primitive other than a primitive for initializing the scrambler, to the external apparatus;

(2) After transmitting a primitive indicating the start of transmission of a frame to the external apparatus; and (3) After transmitting a primitive, a binary primitive, or an extended binary primitive other than a primitive for initializing the scrambler to the external apparatus after transmitting a primitive indicating the start of transmission of a frame to the external apparatus and while the frame is being transmitted.

Thereby, it is possible to prevent a CRC error from occurring.

Each of various functions described in some embodiments of the present invention may be realized by a circuit (e.g., processing circuit). An exemplary processing circuit may be a programmed processor such as central processing unit (CPU). The processor executes computer programs (instructions) stored in a memory thereby perform the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiments may be realized in a processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus capable of exchanging a frame with an external apparatus in a packet mode of serial attached small computer system interface (SAS), the apparatus comprising:
   a controller configured to:
   transmit a frame to the external apparatus, the frame being scrambled, and
   transmit a PACKET_SYNC extended binary primitive to the external apparatus when the frame is not correctly received by the external apparatus, the PACKET_SYNC extended binary primitive causing a de-scrambler of the external apparatus to be initialized.

2. The apparatus of claim 1, wherein the frame is a serial small computer system interface protocol (SSP) frame.

3. The apparatus of claim 2, wherein the controller is configured to receive a response for the frame from the external apparatus, and to transmit a PACKET_SYNC extended binary primitive to the external apparatus when the response includes a NAK primitive indicative of a reception error.

4. The apparatus of claim 3, wherein the controller is configured to use one or more switches to determine whether to enable a function of transmitting a PACKET_SYNC extended binary primitive to the external apparatus at each timing to transmit a PACKET_SYNC extended binary primitive to the external apparatus.

5. The apparatus of claim 1, wherein the frame is an address frame.

6. The apparatus of claim 5, wherein the controller is further configured to transmit a PACKET_SYNC extended binary primitive to the external apparatus when timeout for the frame is detected.

7. The apparatus of claim 6, wherein the controller is configured to use one or more switches to determine whether to enable a function of transmitting a PACKET_SYNC extended binary primitive to the external apparatus at each timing to transmit a PACKET_SYNC extended binary primitive to the external apparatus.

8. The apparatus of claim 1, wherein the controller is configured to transmit a frame to the external apparatus, and to enable a function of transmitting a PACKET_SYNC extended binary primitive to the external apparatus when receiving a response comprising a NAK primitive indicative of a reception error for the transmitted frame from the external apparatus consecutively N times.

9. The apparatus of claim 1, wherein the controller is configured to transmit an address frame to the external apparatus, and to enable a function of transmitting a PACKET_SYNC extended binary primitive to the external apparatus when timeout for the address frame is detected consecutively N times.

10. An apparatus capable of exchanging a frame with an external apparatus in a packet mode of serial attached small computer system interface (SAS), the apparatus comprising:
a controller configured to transmit a PACKET_SYNC extended binary primitive to the external apparatus in accordance with transmitting a SAS protocol layer (SPL) packet including a primitive, a binary primitive, or an extended binary primitive to the external apparatus, the PACKET_SYNC extended binary primitive causing a de-scrambler of the external apparatus to be initialized.

11. The apparatus of claim 10, wherein the controller is further configured to transmit a PACKET_SYNC extended binary primitive to the external apparatus in response to transmitting a primitive indicative of a start of transmission of a frame to the external apparatus.

12. The apparatus of claim 11, wherein the controller is configured to use one or more switches to determine whether to enable a function of transmitting a PACKET_SYNC extended binary primitive to the external apparatus at each timing to transmit a PACKET_SYNC extended binary primitive to the external apparatus.

13. The apparatus of claim 10, wherein the controller is further configured to transmit a PACKET_SYNC extended binary primitive to the external apparatus in response to transmitting a primitive, a binary primitive, or an extended binary primitive to the external apparatus within a period after transmitting a primitive indicative of a start of transmission of a first frame to the external apparatus and before transmitting a primitive indicative of completed transmission of the first frame to the external apparatus.

14. The apparatus of claim 13, wherein the controller is configured to use one or more switches to determine whether to enable a function of transmitting a PACKET_SYNC extended binary primitive to the external apparatus at each timing to transmit a PACKET_SYNC extended binary primitive to the external apparatus.

15. The apparatus of claim 10, wherein the controller is configured to use one or more switches to determine whether to enable a function of transmitting a PACKET_SYNC extended binary primitive to the external apparatus at each timing to transmit a PACKET_SYNC extended binary primitive to the external apparatus.

16. The apparatus of claim 10, wherein the controller is configured to transmit a frame to the external apparatus, and to enable a function of transmitting a PACKET_SYNC extended binary primitive to the external apparatus when receiving a response comprising a NAK primitive indicative of a reception error for the transmitted frame from the external apparatus consecutively N times.

17. The apparatus of claim 10, wherein the controller is configured to transmit an address frame to the external apparatus, and to enable a function of transmitting a PACKET_SYNC extended binary primitive to the external apparatus when timeout for the address frame is detected consecutively N times.

18. A method of controlling an apparatus capable of exchanging a frame with an external apparatus in a packet mode of serial attached small computer system interface (SAS), the method comprising:
transmitting a frame to the external apparatus, the frame being scrambled; and
transmitting a PACKET_SYNC extended binary primitive to the external apparatus when the frame is not correctly received by the external apparatus, the PACKET_SYNC extended binary primitive causing a de-scrambler of the external apparatus to be initialized.

19. The method of controlling the apparatus according to claim 18, wherein the frame is a serial small computer system interface protocol (SSP) frame.

20. The method of controlling the apparatus according to claim 19, further comprising:
receiving a response for the frame from the external apparatus; and
transmitting a PACKET_SYNC extended binary primitive to the external apparatus when the response includes a NAK primitive indicative of a reception error.

* * * * *